(12) United States Patent  
Noguchi

(10) Patent No.: US 9,573,466 B2  
(45) Date of Patent: Feb. 21, 2017

(54) VEHICLE, AND VEHICLE CONTROL METHOD

(71) Applicant: HONDA MOTOR CO., LTD., Tokyo (JP)

(72) Inventor: Masatoshi Noguchi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/376,577

(22) PCT Filed: Feb. 28, 2013

(86) PCT No.: PCT/JP2013/055307  
§ 371 (c)(1),  
(2) Date: Aug. 4, 2014

(87) PCT Pub. No.: WO2013/146057  
PCT Pub. Date: Oct. 3, 2013

(65) Prior Publication Data  
US 2015/0014081 A1    Jan. 15, 2015

(30) Foreign Application Priority Data  
Mar. 30, 2012  (JP) ................................. 2012-081695

(51) Int. Cl.  
*B60K 23/08* (2006.01)  
*B60K 6/20* (2007.10)  
(Continued)

(52) U.S. Cl.  
CPC .............. *B60K 23/08* (2013.01); *B60K 6/442* (2013.01); *B60K 6/448* (2013.01); *B60K 6/52* (2013.01);  
(Continued)

(58) Field of Classification Search  
CPC ..... B60K 17/34; B60K 17/354; B60K 17/356; B60K 6/20; B60K 6/52; B62K 23/08  
See application file for complete search history.

(56) References Cited

U.S. PATENT DOCUMENTS 5,116,078 A * 5/1992 Kanazawa et al. ........ 280/5.503  
5,126,942 A * 6/1992 Matsuda ......................... 701/75  
(Continued)

FOREIGN PATENT DOCUMENTS

CN 101454188 A 6/2009  
JP 04159429 A * 6/1992  
(Continued)

OTHER PUBLICATIONS

International Search Report dated May 28, 2013, issued in corresponding application No. PCT/JP2013/055307.  
(Continued)

*Primary Examiner* — Joseph Rocca  
*Assistant Examiner* — Maurice Williams  
(74) *Attorney, Agent, or Firm* — Westerman, Hattori, Daniels & Adrian, LLP

(57) ABSTRACT

Provided are a vehicle such that drive state can be suitably selected in a configuration including an internal combustion engine, and a vehicle control method. In a vehicle and a method of controlling the same, different values are set for a first switching threshold value for switching from a first independent drive state (in which one of a front wheel and a rear wheel is driven) to a combined drive state, and for a second switching threshold value for switching from a second independent drive state (in which the other of the front wheel and the rear wheel is driven by an internal combustion engine) to the combined drive state.

13 Claims, 15 Drawing Sheets

(51) Int. Cl.
  *B60K 17/354* (2006.01)
  *B60K 17/356* (2006.01)
  *B60W 10/08* (2006.01)
  *B60W 20/00* (2016.01)
  *B60K 6/52* (2007.10)
  *B60W 30/02* (2012.01)
  *B60K 6/448* (2007.10)
  *B60K 6/442* (2007.10)
  *B60W 10/06* (2006.01)

(52) U.S. Cl.
  CPC ........... *B60K 17/354* (2013.01); *B60K 17/356* (2013.01); *B60K 23/0808* (2013.01); *B60W 10/06* (2013.01); *B60W 10/08* (2013.01); *B60W 20/00* (2013.01); *B60W 20/20* (2013.01); *B60W 30/02* (2013.01); *B60K 2023/085* (2013.01); *B60K 2023/0858* (2013.01); *B60W 2520/125* (2013.01); *Y02T 10/6243* (2013.01); *Y02T 10/6265* (2013.01); *Y02T 10/7258* (2013.01); *Y10S 903/93* (2013.01)

(56) References Cited

U.S. PATENT DOCUMENTS

| | | | | |
|---|---|---|---|---|
| 5,259,476 A * | 11/1993 | Matsuno | ............ | B60K 23/0808 180/197 |
| 5,282,674 A * | 2/1994 | Matsuda | ............... | B60T 8/1755 303/113.5 |
| 5,301,768 A * | 4/1994 | Ishikawa | ............ | B60K 23/0808 180/197 |
| 5,332,059 A * | 7/1994 | Shirakawa et al. | ........... | 180/197 |
| 5,540,299 A | 7/1996 | Tohda et al. | | |
| 5,671,144 A * | 9/1997 | Ryan | ....................... | B60K 28/16 180/197 |
| 5,691,900 A * | 11/1997 | Luckevich | ...................... | 701/41 |
| 5,752,211 A * | 5/1998 | Takasaki | ............ | B60K 23/0808 180/197 |
| 5,788,345 A * | 8/1998 | Sakane et al. | ................. | 303/146 |
| 6,246,947 B1 * | 6/2001 | Batistic | ................. | B60T 8/1755 303/186 |
| 6,640,178 B2 * | 10/2003 | Wakamatsu | .......... | B60W 10/06 477/107 |
| 7,610,980 B2 * | 11/2009 | Mori | .................... | B60K 17/344 180/233 |
| 8,195,348 B2 | 6/2012 | Mizutani et al. | | |
| 8,219,296 B1 * | 7/2012 | Handa | ............................. | 701/69 |
| 8,543,300 B2 * | 9/2013 | Matsuno | .............. | B60T 8/1755 701/53 |
| 8,670,887 B2 * | 3/2014 | Nishimori | ............. | B60W 20/40 180/6.48 |
| 2002/0046893 A1 * | 4/2002 | Handa | .................... | B60K 23/06 180/247 |
| 2005/0067202 A1 | 3/2005 | Shimizu | | |
| 2005/0228554 A1 * | 10/2005 | Yamamoto et al. | ............ | 701/22 |
| 2009/0250283 A1 * | 10/2009 | Ghoneim | ........... | B60K 23/0808 180/233 |
| 2012/0015772 A1 | 1/2012 | Kira et al. | | |
| 2012/0221228 A1 * | 8/2012 | Noumura et al. | ............ | 701/110 |
| 2013/0179044 A1 * | 7/2013 | Ishikawa et al. | ................ | 701/53 |
| 2013/0261862 A1 * | 10/2013 | Nishimori et al. | ............. | 701/22 |
| 2014/0100750 A1 * | 4/2014 | Stares | .............................. | 701/69 |

FOREIGN PATENT DOCUMENTS

| | | |
|---|---|---|
| JP | 06-038305 A | 2/1994 |
| JP | 06-328965 A | 11/1994 |
| JP | 09-284911 A | 10/1997 |
| JP | 2008-037422 A | 2/2008 |
| JP | 2008-230513 A | 10/2008 |
| JP | 2008-273289 A | 11/2008 |
| JP | 2011-252564 A | 12/2011 |
| WO | WO 2012028923 A1 * | 3/2012 ............ B60W 50/06 |

OTHER PUBLICATIONS

Office Action and Search Report dated May 27, 2016, issued in counterpart Chinese Patent Application No. 201380016576.0, with English translation. (10 pages).

* cited by examiner

VEHICLE, AND VEHICLE CONTROL METHOD

TECHNICAL FIELD

The present invention relates to a vehicle, which is capable of switching between an all-wheel drive mode and at least one of a front wheel drive mode and a rear wheel drive mode, as well as to a method of controlling such a vehicle.

BACKGROUND ART

U.S. Pat. No. 5,540,299 (hereinafter referred to as "U.S. Pat. No. 5,540,299A") discloses a method of driving a vehicle having an engine 2 for driving front wheels 1FL, 1FR (primarily driven wheels) and motors ML, MR for driving rear wheels 1RL, 1RR (secondarily driven wheels) (see, Abstract, FIG. 1, and Claim 1). According to U.S. Pat. No. 5,540,299A, when a lateral G (lateral acceleration) is of a predetermined value or greater (W23: YES in FIG. 15), execution of normal driving is inhibited, in view of the fact that it is preferred to leave control over the posture of the vehicle body under the manual operation of the driver (see, W31 in FIG. 15, and column 22, lines 22 through 33). The term "normal driving" implies an assisting drive, and is defined as an antonym of the term "reverse driving", which implies braking (see, column 8, lines 55 through 59). When the answer to W23 in FIG. 15 is YES, it also is made possible to forcibly execute normal driving in an independent mode, from the viewpoint that it is preferred that stability of the vehicle is improved by operating the vehicle in a four-wheel drive mode (see, column 22, lines 33 through 40).

A four-wheel drive vehicle has also been proposed in which the front and rear wheels thereof can be driven independently of each other (see, U.S. Patent Application Publication No. 2012/0015772, hereinafter referred to as "US2012/0015772A1"). According to US2012/0015772A1, a drive unit 6, which comprises an internal combustion engine 4 and an electric motor 5 arranged in series, drives the front wheels Wf, whereas electric motors 2A, 2B drive the rear wheels Wr (see, FIG. 1, and paragraphs [0084], [0085]).

SUMMARY OF INVENTION

According to U.S. Pat. No. 5,540,299A, the front wheels 1FL, 1FR, which are driven by the engine 2, serve as primarily driven wheels, whereas the rear wheels 1RL, 1RR, which are driven by the motors ML, MR, serve as secondarily driven wheels (see, claim 1). Stated otherwise, the vehicle disclosed in U.S. Pat. No. 5,540,299A is operable in a front-wheel drive mode, in which the front wheels are driven only by the engine 2, and also in a four-wheel drive mode, in which all of the wheels are driven by the engine 2 and the motors ML, MR. However, U.S. Pat. No. 5,540,299A is silent concerning a rear-wheel drive mode, in which the rear wheels are driven only by the motors ML, MR. Furthermore, U.S. Pat. No. 5,540,299A reveals nothing specific in relation to the predetermined value for the lateral G, which is used in step W23 of FIG. 15.

The present invention has been made in view of the aforementioned problems. An object of the present invention is to provide a vehicle and a control method for the vehicle, which enable an appropriate drive mode to be selected in an arrangement having an internal combustion engine.

According to the present invention, there is provided a vehicle comprising a first drive apparatus configured to drive one of a front wheel and a rear wheel, a second drive apparatus configured to drive another one of the front wheel and the rear wheel, the second drive apparatus including an internal combustion engine, a drive mode controller configured to control the first drive apparatus and the second drive apparatus in order to control drive modes of the front wheel and the rear wheel, and an internal combustion engine controller configured to control an operating state of the internal combustion engine, wherein the drive mode controller switches between a first independent drive mode, in which the vehicle is driven only by a drive force from the first drive apparatus, a second independent drive mode, in which the vehicle is driven only by a drive force from the second drive apparatus, and a composite drive mode, in which the vehicle is driven by a drive force from the first drive apparatus and the second drive apparatus, wherein the drive mode controller switches from the first independent drive mode to the composite drive mode, and from the second independent drive mode to the composite drive mode, based on a lateral acceleration-related value in relation to a lateral acceleration acting on the vehicle, and wherein different values are set as a first switching threshold value, which indicates the lateral acceleration-related value for switching from the first independent drive mode to the composite drive mode, and a second switching threshold value, which indicates the lateral acceleration-related value for switching from the second independent drive mode to the composite drive mode.

According to the present invention, different values are set as the first switching threshold value, which is used for switching from the first independent drive mode (a mode in which one of the front and rear wheels is driven) to the composite drive mode, and the second switching threshold value, which is used for switching from the second independent drive mode (a mode in which another one of the front and rear wheels is driven by the internal combustion engine) to the composite drive mode. Stated otherwise, it is possible to switch the threshold value for the lateral acceleration-related value to different values at respective times when the internal combustion engine is in operation, and when the internal combustion engine is stopped. Consequently, it is possible to switch between different drive modes in view of achieving a balance between energy consumption while the internal combustion engine is in operation, and vehicle driving stability, i.e., the capability of the vehicle to be driven as the driver wishes, for example.

The second switching threshold value may be less than the first switching threshold value. In this manner, it is possible to switch from the second independent drive mode, in which the vehicle is driven by the internal combustion engine, to the composite drive mode more quickly than switching from the first independent drive mode, in which the vehicle is not driven by the internal combustion engine, to the composite drive mode. Therefore, if the internal combustion engine is in operation prior to switching to the composite drive mode, an increase in driving stability can be achieved more quickly.

According to the present invention, there also is provided a vehicle comprising a first drive apparatus configured to drive one of a front wheel and a rear wheel, a second drive apparatus configured to drive another one of the front wheel and the rear wheel, the second drive apparatus including an internal combustion engine, a drive mode controller configured to control the first drive apparatus and the second drive apparatus in order to control drive modes of the front wheel and the rear wheel, and an internal combustion engine controller configured to control an operating state of the internal combustion engine, wherein the drive mode controller switches between a first independent drive mode, in which the vehicle is driven only by a drive force from the first drive apparatus, and a composite drive mode, in which the vehicle is driven by a drive force from the first drive apparatus and the second drive apparatus, wherein the drive mode controller switches from the first independent drive mode to the composite drive mode, based on a lateral acceleration-related value in relation to a lateral acceleration acting on the vehicle, and wherein different values are set as a stopped-state threshold value, which indicates the lateral acceleration-related value for switching from the first independent drive mode to the composite drive mode while the internal combustion engine is stopped, and an operating-state threshold value, which indicates the lateral acceleration-related value for switching from the first independent drive mode to the composite drive mode while the internal combustion engine is in operation.

According to the present invention, different values are set as the stopped-state threshold value, which is used for switching from the first independent drive mode (a mode in which one of the front and rear wheels is driven) to the composite drive mode while the internal combustion engine is stopped, and the operating-state threshold value, which is used for switching from the first independent drive mode to the composite drive mode while the internal combustion engine is in operation. Stated otherwise, it is possible to switch the threshold value for the lateral acceleration-related value to different values at respective times when the internal combustion engine is in operation, and when the internal combustion engine is stopped. Consequently, it is possible to switch between different drive modes in view of achieving a balance between energy consumption while the internal combustion engine is in operation, and vehicle driving stability, i.e., the capability of the vehicle to be driven as the driver wishes, for example.

The operating-state threshold value may be less than the stopped-state threshold value. In this manner, it is possible to switch from the first independent drive mode to the composite drive mode more quickly when the internal combustion engine is in operation than when the internal combustion engine is stopped. Therefore, if the internal combustion engine is in operation prior to switching from the first independent drive mode to the composite drive mode, an increase in driving stability can be achieved more quickly.

In the first independent drive mode, the internal combustion engine may apply a drive force selectively to an electric generator disposed in the vehicle. In the first independent drive mode, therefore, the electric generator can be operated by the drive force from the internal combustion engine in order to supply electric power to components in the vehicle.

According to the present invention, there further is provided a method of controlling a vehicle including a first drive apparatus configured to drive one of a front wheel and a rear wheel, a second drive apparatus configured to drive another one of the front wheel and the rear wheel, the second drive apparatus including an internal combustion engine, a drive mode controller configured to control the first drive apparatus and the second drive apparatus in order to control drive modes of the front wheels and the rear wheels, and an internal combustion engine controller configured to control an operating state of the internal combustion engine, the method performed by the drive mode controller comprising switching between a first independent drive mode, in which the vehicle is driven only by a drive force from the first drive apparatus, a second independent drive mode in which the vehicle is driven only by a drive force from the second drive apparatus, and a composite drive mode, in which the vehicle is driven by a drive force from the first drive apparatus and the second drive apparatus, switching from the first independent drive mode to the composite drive mode, and from the second independent drive mode to the composite drive mode, based on a lateral acceleration-related value in relation to a lateral acceleration acting on the vehicle, and setting different values as a first switching threshold value, which indicates the lateral acceleration-related value for switching from the first independent drive mode to the composite drive mode, and a second switching threshold value, which indicates the lateral acceleration-related value for switching from the second independent drive mode to the composite drive mode.

According to the present invention, there also is provided a method of controlling a vehicle including a first drive apparatus configured to drive one of a front wheel and a rear wheel, a second drive apparatus configured to drive another one of the front wheel and the rear wheel, the second drive apparatus including an internal combustion engine, a drive mode controller configured to control the first drive apparatus and the second drive apparatus in order to control drive modes of the front wheels and the rear wheels, and an internal combustion engine controller configured to control an operating state of the internal combustion engine, the method performed by the drive mode controller comprising switching between a first independent drive mode, in which the vehicle is driven only by a drive force from the first drive apparatus, and a composite drive mode, in which the vehicle is driven by a drive force from the first drive apparatus and the second drive apparatus, switching from the first independent drive mode to the composite drive mode, based on a lateral acceleration-related value in relation to a lateral acceleration acting on the vehicle, and setting different values as a stopped-state threshold value, which indicates the lateral acceleration-related value for switching from the first independent drive mode to the composite drive mode while the internal combustion engine is stopped, and an operating-state threshold value, which indicates the lateral acceleration-related value for switching from the first independent drive mode to the composite drive mode while the internal combustion engine is in operation.

DESCRIPTION OF EMBODIMENTS

I. Embodiment

A. Arrangement

A-1. Overall Arrangement

Figure 1:
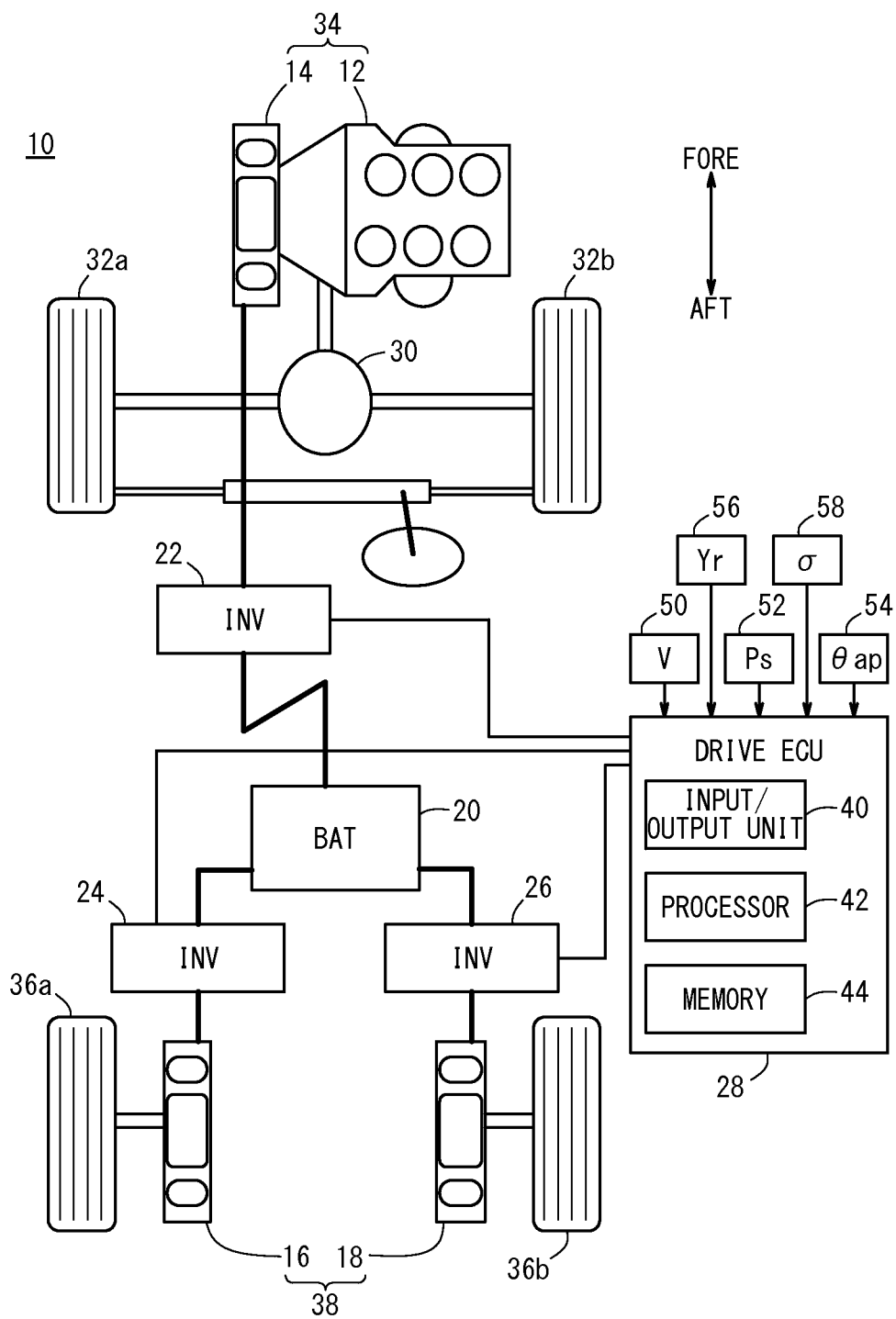
FIG. 1 is a schematic view showing a drive system and related components of a vehicle according to an embodiment of the present invention.

FIG. 1 schematically shows a drive system and related components of a vehicle 10 according to an embodiment of the present invention. As shown in FIG. 1, the vehicle 10 has an engine 12 and a first traction motor 14 (hereinafter referred to as a "first motor 14" or a "front motor 14"), which are disposed in a series-connected layout in a front portion of the vehicle 10, second and third traction motors 16, 18 (hereinafter referred to as "second and third motors 16, 18" or "rear motors 16, 18"), which are disposed in a rear portion of the vehicle 10, a high-voltage battery 20 (hereinafter referred to as a "battery 20"), first through third inverters 22, 24, 26, and a drive electronic control unit 28 (hereinafter referred to as a "drive ECU 28" or simply an "ECU 28").

The engine 12 and the first motor 14 transmit a drive force (hereinafter referred to as a "front wheel drive force Ff") through a transmission 30 to a left front wheel 32a and a right front wheel 32b (hereinafter referred to collectively as "front wheels 32"). The engine 12 and the first motor 14 make up a front wheel drive apparatus 34 (steerable wheel drive device). For example, when the vehicle 10 is under a low load, the front wheels 32 are driven solely by the first motor 14. When the vehicle 10 is under a medium load, the front wheels 32 are driven solely by the engine 12. When the vehicle 10 is under a high load, the front wheels 32 are driven by both the engine 12 and the first motor 14. While the engine 12 and the transmission 30 are disconnected from each other or are connected to each other through a non-illustrated clutch, the engine 12 is capable of driving the first motor 14 so as to enable the first motor 14 to generate electric power, and the generated electric power can be used to charge the battery 20 or is supplied to accessories, not shown. Stated otherwise, the first motor 14 can be used as an electric generator.

The second motor 16 includes an output shaft, which is coupled to the rotational shaft of a left rear wheel 36a, and transmits a drive force to the left rear wheel 36a. The third motor 18 includes an output shaft, which is coupled to the rotational shaft of a right rear wheel 36b, and transmits a drive force to the right rear wheel 36b. The second and third motors 16, 18 make up a rear wheel drive apparatus 38 (i.e., a non-steerable wheel drive device). The left rear wheel 36a and the right rear wheel 36b will hereinafter be referred to collectively as "rear wheels 36". The drive force, which is transmitted from the rear wheel drive apparatus 38 to the rear wheels 36, will hereinafter be referred to as a "rear wheel drive force Fr".

The high-voltage battery 20 supplies electric power through the first through third inverters 22, 24, 26 to the first through third motors 14, 16, 18. The high-voltage battery 20 is charged with regenerated electric power Preg from the first through third motors 14, 16, 18.

The drive ECU 28 controls the engine 12 and the first through third inverters 22, 24, 26 based on output signals from various sensors and various electronic control units (hereinafter referred to as "ECUs"), for thereby controlling the output power of the engine 12 and the first through third motors 14, 16, 18. The drive ECU 28 includes an input/output unit 40, a processor 42, and a memory 44. The drive ECU 28 may comprise a combination of ECUs. For example, plural ECUs, which are associated respectively with the engine 12 and the first through third motors 14, 16, 18, and an ECU for managing drive states of the engine 12 and the first through third motors 14, 16, 18, may be combined for use as the drive ECU 28.

The various sensors, which supply output signals to the drive ECU 28, include a vehicle speed sensor 50, a shift position sensor 52, an accelerator pedal opening sensor 54, a yaw rate sensor 56, and a tire steering angle sensor 58.

A-2. Arrangements and Functions of Various Components

The engine 12 comprises a six-cylinder engine, although the engine 12 may be a different type of engine, including a two-cylinder engine, a four-cylinder engine, an eight-cylinder engine, etc. The engine 12 is not limited to a gasoline engine, but may be another type of engine, including a diesel engine, an air engine, etc.

Each of the first through third motors 14, 16, 18 comprises a three-phase AC brushless motor, but may be another type of motor, including a three-phase AC brush motor, a single-phase AC motor, a DC motor, etc. The first through third motors 14, 16, 18 may have identical or different specifications. Further, the left rear wheel 36a and the right rear wheel 36b may be driven by a single traction motor.

The first through third inverters 22, 24, 26 each comprises a three-phase bridge design, which serves to convert DC power into three-phase AC power, and to supply the three-phase AC power to the first through third motors 14, 16, 18. The first through third inverters 22, 24, 26 also convert AC power, which is regenerated by the first through third motors 14, 16, 18, into DC power, and the DC power is supplied to the high-voltage battery 20.

The high-voltage battery 20 is an energy storage device including a plurality of battery cells, which may be constituted from a lithium ion secondary battery, a nickel hydrogen secondary battery, or a capacitor. According to the present embodiment, the high-voltage battery 20 comprises a lithium ion secondary battery. DC/DC converters, not shown, may be connected between the first through third inverters 22, 24, 26 and the high-voltage battery 20, for elevating or stepping down an output voltage from the high-voltage battery 20, or output voltages from the first through third motors 14, 16, 18.

The drive system of the vehicle 10 may be arranged as disclosed in US2012/0015772A1, for example.

The vehicle speed sensor 50 detects the vehicle speed V [km/h]. The shift position sensor 52 detects respective shift positions, one at a time, at which a shift lever, not shown, is moved, including "P" as a parking range, "N" as a neutral range, "D" as a forward range, and "R" as a reverse range (hereinafter referred to as "shift positions Ps"). The accelerator pedal opening sensor 54 detects an opening of a non-illustrated accelerator pedal (hereinafter referred to as an "accelerator opening θap"). The yaw rate sensor 56 detects a yaw rate Yr of the vehicle 10. The tire steering angle sensor 58 detects an actual steering angle (hereinafter referred to as a "tire steering angle σ") of the front wheels 32 as steerable wheels.

B. Various Control Processes

B-1. Switching Between Drive Modes
(1-1. Overview)

Figure 2:
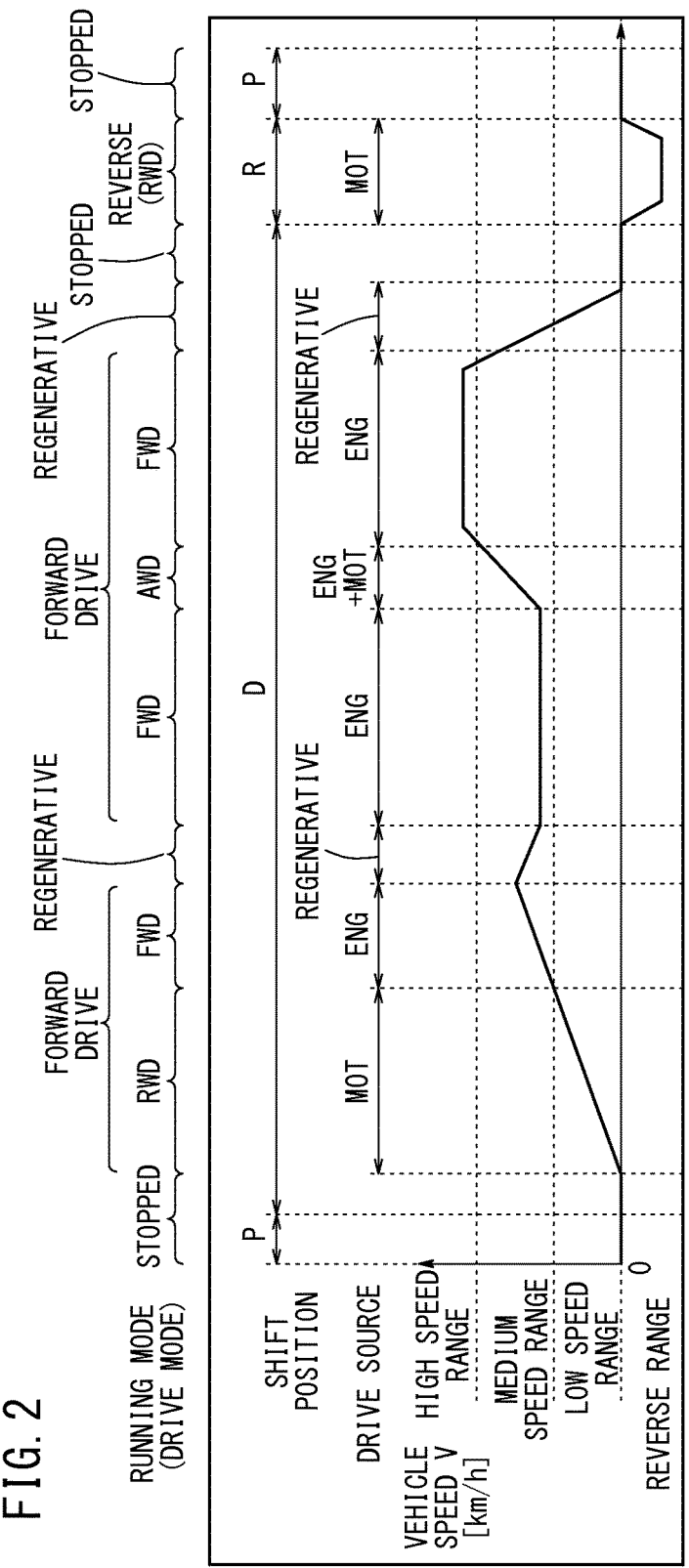
FIG. 2 is a diagram showing by way of example a manner in which running modes (drive modes) and drive sources are switched according to the embodiment.

FIG. 2 shows by way of example the manner in which running modes (drive modes) and drive sources are switched according to the present embodiment. According to the present embodiment, the running modes (drive modes) and the drive sources are switched under the control of the drive ECU 28.

In FIG. 2, "RUNNING MODE" indicates whether the vehicle 10 is stopped, is driven forwardly, regenerates electric power, or is driven in reverse, and "DRIVE MODE" indicates whether the vehicle 10 is driven in an "RWD" (Rear Wheel Drive) mode, an "FWD" (Front Wheel Drive) mode, or an "AWD" (All-Wheel Drive) mode. Each of the RWD and FWD modes is a two wheel drive (2WD) mode, whereas the AWD mode is a four wheel drive (4WD) mode. In FIG. 2, "REGENERATIVE" indicates that at least one of the first through third motors 14, 16, 18 is regenerating electric power.

In FIG. 2, "SHIFT POSITION" indicates a position to which the non-illustrated shift lever is moved. "P" refers to a parking range, "N" refers to a neutral range, "D" refers to the forward range, and "R" refers to a reverse range.

In FIG. 2, "DRIVE SOURCE" indicates an apparatus for driving the vehicle 10. "ENG" refers to the engine 12, "MOT" refers to the rear motors 16, 18 when the drive mode is "RWD", "ENG+MOT" refers to the engine 12 and the front and rear motors 14, 16, 18 when the drive mode is "AWD", and "REGENERATE" refers to at least one of the front and rear motors 14, 16, 18.

According to the present embodiment, as shown in FIG. 2, the vehicle speed V is classified into a "LOW SPEED RANGE", a "MEDIUM SPEED RANGE", a "HIGH SPEED RANGE", and a "REVERSE RANGE", and the drive sources are switched depending on these speed ranges.

More specifically, the RWD mode is used when the vehicle 10 is driven forwardly at the vehicle speed V in the low speed range, and when the vehicle 10 is driven in reverse.

The FWD mode and the AWD mode are used when the vehicle 10 is driven forwardly at the vehicle speed V in the medium speed range. The FWD mode and the AWD mode are switched in the following manner. Namely, a threshold value is established with respect to the accelerator opening θap (hereinafter referred to as an "accelerator opening threshold value THθ" or a "threshold value THθ"). If the accelerator opening θap is less than the accelerator opening threshold value THθ, the FWD mode is selected. If the accelerator opening θap is greater than the accelerator opening threshold value THθ, the AWD mode is selected. If the vehicle 10 is driven forwardly at the vehicle speed V in the high speed range, the FWD mode is used.

Figure 13:
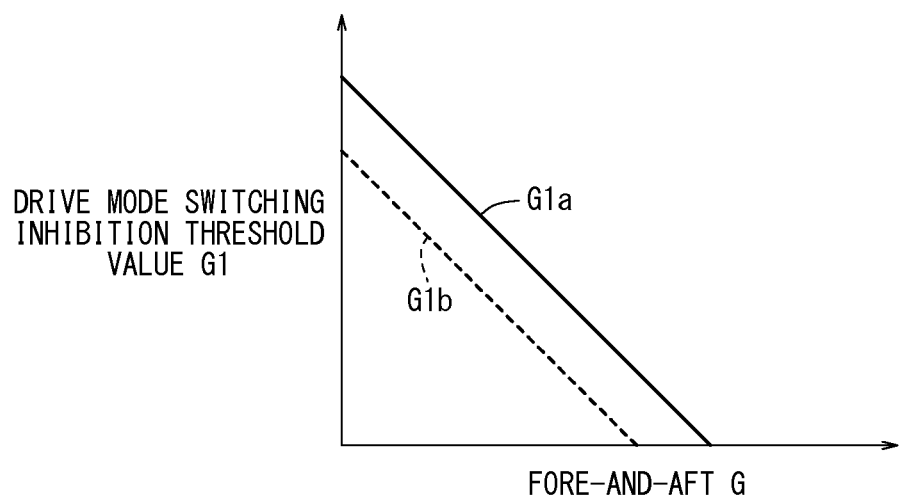
FIG. 13 is a diagram showing a first example of a relationship between fore-and-aft accelerations (hereinafter referred to as "fore-and-aft Gs") and drive mode switching inhibition threshold values.

The running modes (drive modes) may be switched according to the process shown in FIG. 13 and the related description thereof in US2012/0015772A1.

(1-2. Specific Switching of Drive Modes)
(1-2-1. Overall Flow)

Figure 3:
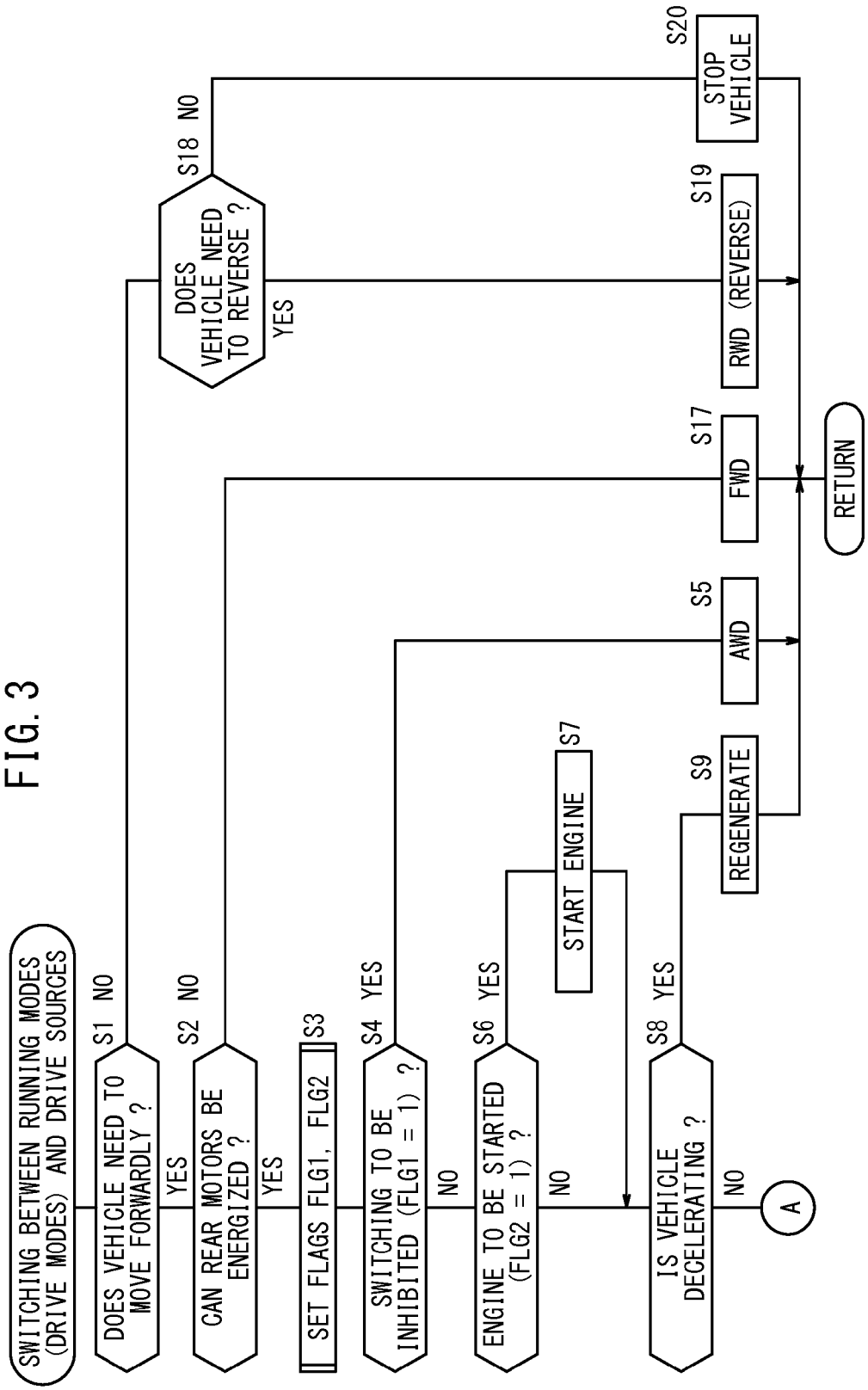
FIG. 3 is a first flowchart of a processing sequence for switching the running modes (drive modes) and the drive sources according to the embodiment.
Figure 4:
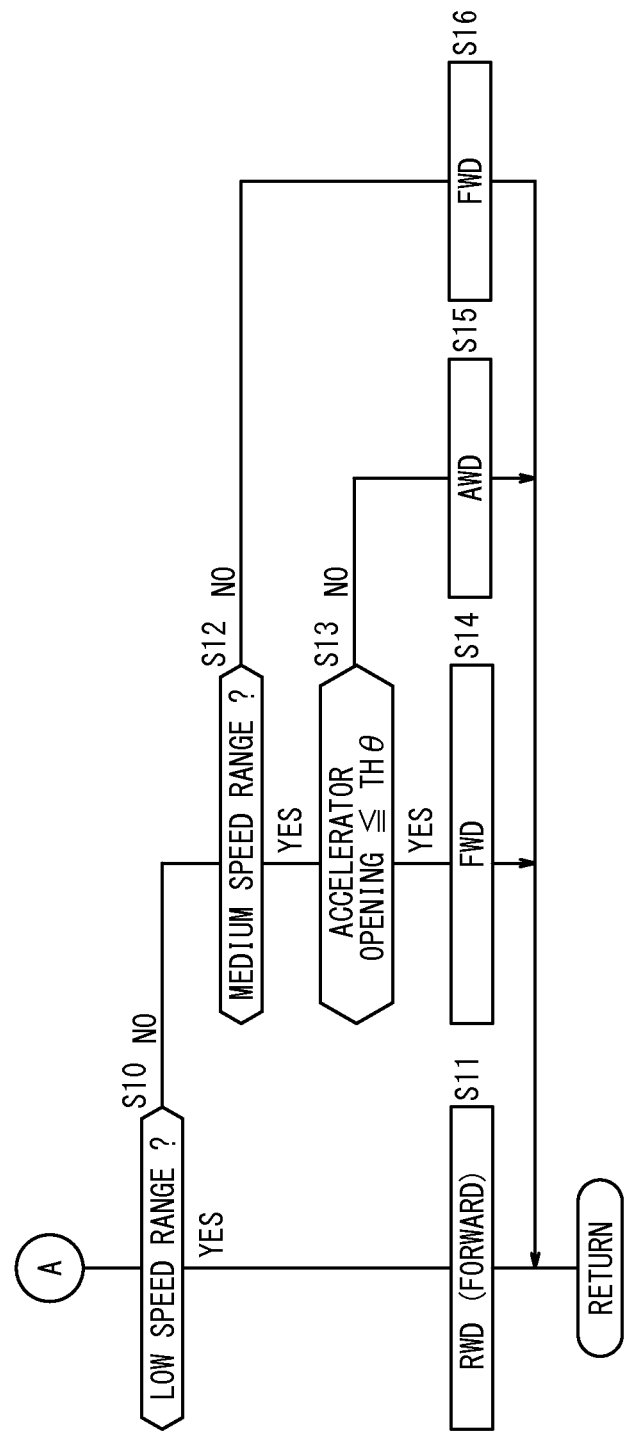
FIG. 4 is a second flowchart of the processing sequence for switching the running modes (drive modes) and the drive sources according to the embodiment.

FIGS. 3 and 4 are first and second flowcharts, respectively, of a processing sequence for switching the running modes (drive modes) and the drive sources according to the present embodiment. In step S1 of FIG. 3, the ECU 28 determines whether or not it is necessary for the vehicle 10 to move in a forward direction. The ECU 28 makes such a judgment by confirming whether or not the shift position Ps, which is sent from the shift position sensor 52, is a position indicative of forward movement (the forward range D), for example. If it is necessary for the vehicle 10 to move forwardly (step S1: YES), control proceeds to step S2.

In step S2, the ECU 28 determines whether or not the rear motors 16, 18 are capable of being energized. The ECU 28 makes such a judgment based on the temperatures of the rear motors 16, 18, the occurrence of a failure of the rear motors 16, 18, and an SOC (State Of Charge) of the battery 20, for example.

More specifically, the respective temperatures of the rear motors 16, 18 (hereinafter referred to as "rear motor temperatures") are detected by non-illustrated temperature sensors, and if it is determined that the rear motor temperatures exceed a threshold value indicative of overheating of the rear motors 16, 18, the ECU 28 judges that the rear motors 16, 18 cannot be energized. Furthermore, if output signals from various sensors (e.g., voltage sensors, current sensors, and rotational angle sensors) in relation to the rear motors 16, 18 exceed a threshold value for judging the occurrence of a failure of the rear motors 16, 18, the ECU 28 judges that the rear motors 16, 18 cannot be energized. In addition, if the SOC of the battery 20 is lower than a threshold value for determining if the SOC of the battery 20 is sufficiently large to enable energization of the rear motors 16, 18, the ECU 28 judges that the rear motors 16, 18 cannot be energized. As described later, the ECU 28 may also determine whether or not the rear motors 16, 18 are capable of being energized based on other judgment criteria apart from the above threshold values.

If the rear motors 16, 18 can be energized (step S2: YES), then in step S3, the ECU 28 sets a first flag FLG1 and a second flag FLG2 primarily based on a lateral G (lateral acceleration-related value). The first flag FLG1 is a flag concerning whether or not the drive modes should be inhibited from switching, i.e., a drive mode switching inhibition threshold value, and will be used in step S4, to be described below. The second flag FLG2 is a flag concerning whether or not the engine 12 should be started, regardless of the fact that the drive mode is in any one of the FWD, RWD, and AWD modes, i.e., an engine start judgment flag, and will be used in step S6, to be described below. Details of the process for setting the first flag FLG1 and the second flag FLG2 will be described later with reference to FIG. 7.

In step S4, the ECU 28 judges whether or not the drive modes should be inhibited from switching based on the first flag FLG1. More specifically, if the first flag FLG1 is 0, the ECU 28 does not inhibit the drive modes from being switched, i.e., allows the drive modes to be switched, and if the first flag FLG1 is 1, the ECU 28 inhibits the drive modes from being switched.

If the first flag FLG1 is 1 and the drive modes should be inhibited from switching (step S4: YES), then in step S5, the ECU 28 locks the drive mode in the AWD mode. If the drive modes should not be inhibited from switching (step S4: NO), control proceeds to step S6.

In step S6, the ECU 28 judges whether or not the engine 12 should be started based on the second flag FLG2. More specifically, if the second flag FLG2 is 0, the ECU 28 judges at step S6 that the engine 12 should not be started, and if the second flag FLG2 is 1, the ECU 28 judges that the engine 12 should be started, regardless of the fact that the drive mode is in any one of the FWD, RWD, and AWD modes.

If based on the second flag FLG2 it is determined that the engine 12 should not be started (S6: NO), control proceeds to step S8. If based on the second flag FLG2 it is determined that the engine 12 should be started (step S6: YES), then in step S7, the ECU 28 starts the engine 12, and thereafter, control proceeds to step S8.

As described above, the engine 12 is started in step S7, regardless of the fact that the drive mode is in any one of the FWD, RWD, and AWD modes. Stated otherwise, if at the present time, the drive mode is in the FWD or the AWD mode, since the engine 12 has already been operating, the engine 12 is kept in operation. If at the present time, the drive mode is in the RWD mode, then since the rear motors 16, 18 are being used as drive sources, the engine 12 is started, but remains in an idling state. The engine 12 is kept idling in order to enable a smooth change to the AWD mode, because if the second flag FLG2 is 1, the drive modes will subsequently be inhibited from switching and thus it is highly likely that switching to the AWD mode will occur (step S5).

In step S8, the ECU 28 judges whether or not the vehicle 10 is decelerating based on the vehicle speed V from the vehicle speed sensor 50, for example. If the vehicle 10 is decelerating (step S8: YES), then in step S9, the ECU 28 selects the running mode for regenerating electric power. The ECU 28 controls at least one of the first through third traction motors 14, 16, 18 in order to regenerate electric power. If the vehicle 10 is not decelerating (step S8: NO), then control proceeds to step S10 of FIG. 4.

In step S10 of FIG. 4, the ECU 28 judges whether the vehicle 10 is being driven in the low speed range, e.g., from 0 to 30 km/h, based on the vehicle speed V from the vehicle speed sensor 50. If the vehicle 10 is being driven in the low speed range (step S10: YES), then in step S11, the ECU 28 selects the RWD mode as the drive mode. At this time, the vehicle 10 is driven by the rear motors 16, 18. If the vehicle 10 is not driven in the low speed range (step S10: NO), control proceeds to step S12.

In step S12, the ECU 28 judges whether the vehicle 10 is being driven in the medium speed range, e.g., from 31 to 80 km/h, based on the vehicle speed V from the vehicle speed sensor 50. If the vehicle 10 is being driven in the medium speed range (step S12: YES), then in step S13, the ECU 28 judges whether or not the accelerator opening θap is equal to or less than the accelerator opening threshold value THθ. As described above, the accelerator opening threshold value THθ is a threshold value that is used for selecting the FWD mode or the AWD mode.

If the accelerator opening θap is equal to or less than the accelerator opening threshold value THθ (step S13: YES), then in step S14, the ECU 28 selects the FWD mode as the drive mode. At this time, the vehicle 10 is driven by either one or both of the engine 12 and the first motor 14. If the accelerator opening θap is not equal to or less than the accelerator opening threshold value THθ (step S13: NO), then in step S15, the ECU 28 selects the AWD mode as the drive mode. At this time, the vehicle 10 is driven by the engine 12 and the first through third motors 14, 16, 18.

Returning to S12, if the vehicle 10 is not being driven in the medium speed range (step S12: NO), then the vehicle 10 is judged as being driven in the high speed range, e.g., at a speed of 81 km/h or greater. In this case, in step S16, ECU 28 selects the FWD mode as the drive mode.

Returning to step S2 of FIG. 3, if the rear motors 16, 18 are incapable of being energized (step S2: NO), then in step S17, the ECU 28 selects the FWD mode as the drive mode. Consequently, the vehicle 10 is prevented from changing to the RWD mode or the AWD mode in a condition in which the rear motors 16, 18 cannot be energized.

Returning to step S1, if the vehicle 10 is not required to move forwardly (step S1: NO), then in step S18, the ECU 28 judges whether or not the vehicle 10 needs to be driven in reverse. The ECU 28 makes such a judgment by confirming whether or not the shift position Ps, which is sent from the shift position sensor 52, is a position indicative of reverse movement (reverse range R), for example. If driving of the vehicle 10 in reverse is required (step S18: YES), then in step S19, the ECU 28 selects the RWD mode as the drive mode. If driving of the vehicle 10 in reverse is not required (step S18: NO), then in step S20, the ECU 28 selects a running mode for stopping the vehicle 10, whereupon the engine 12 and the first through third motors 14, 16, 18 are stopped.

(1-2-2. Setting of First Flag FLG1 and Second Flag FLG2)
(1-2-2-1. Concept)

Figure 5:
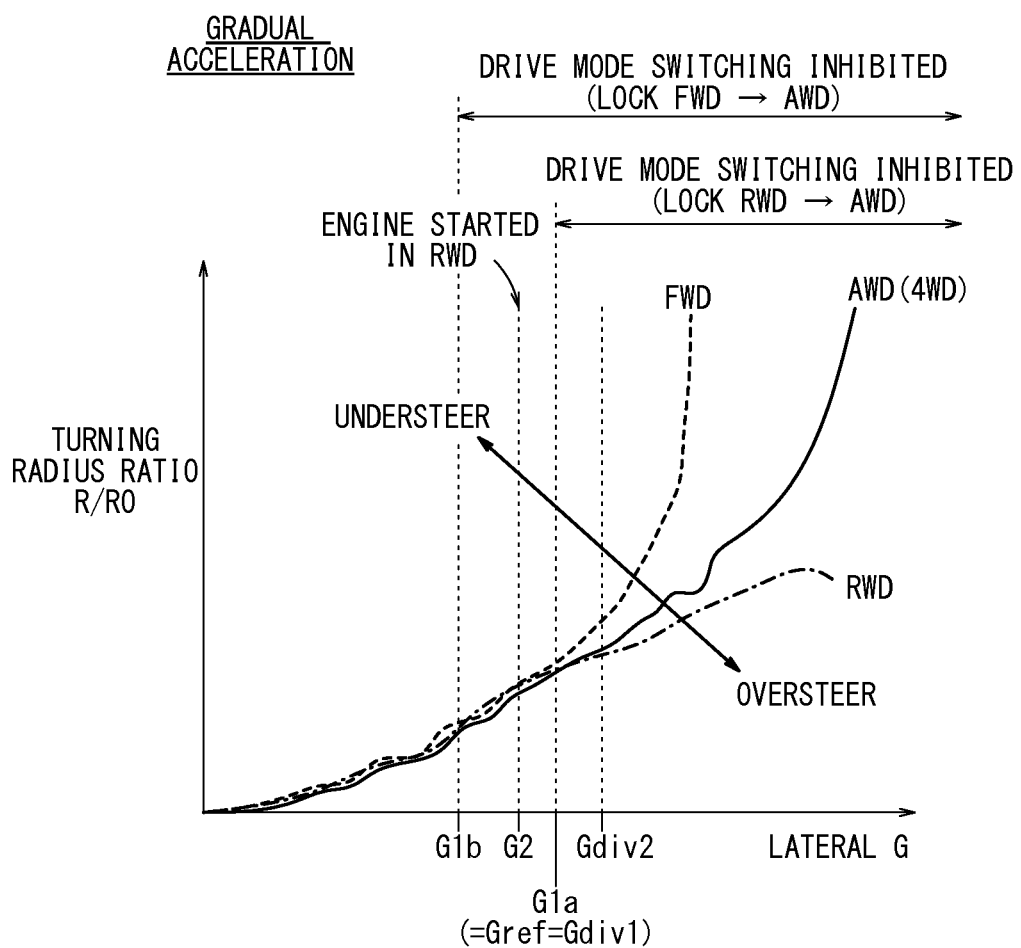
FIG. 5 is a diagram showing a relationship between lateral accelerations (hereinafter referred to as "lateral Gs") and turning radius ratios that take place upon gradual acceleration in different drive modes of the vehicle.

FIG. 5 shows a relationship between lateral Gs and turning radius ratios R/R0 upon gradual acceleration, corresponding to the drive modes of the vehicle 10. The term "gradual acceleration" implies that the vehicle 10 is being gradually accelerated, i.e., that the derivative of the vehicle speed V with respect to time is small, and corresponds to a relatively small accelerator opening θap. The turning radius ratio R/R0 refers to a value indicative of how much the actual turning radius R [m] deviates from a reference turning radius R0 [m]. The turning radius ratio R/R0 is used as an indicator for indicating the turning characteristics of the vehicle 10.

Details of a process for calculating the actual turning radius R and the reference turning radius R0 are disclosed in Japanese Laid-Open Patent Publication No. 2011-252564 or Japanese Laid-Open Patent Publication No. 2008-230513, for example.

If the actual turning radius R becomes less than the reference turning radius R0, and hence the turning radius ratio R/R0 becomes smaller, then oversteering of the vehicle 10 tends to occur. Conversely, if the actual turning radius R becomes greater than the reference turning radius R0, and hence the turning radius ratio R/R0 becomes greater, then understeering of the vehicle 10 tends to occur.

Figure 6:
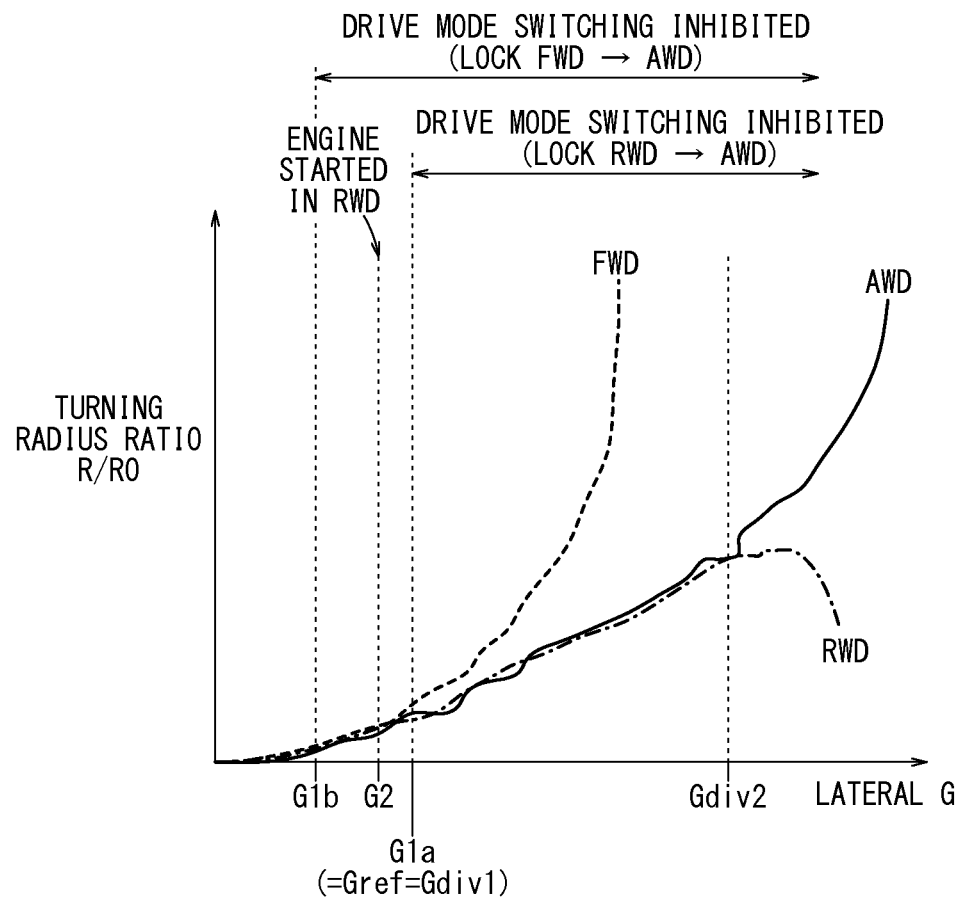
FIG. 6 is a diagram showing a relationship between lateral Gs and turning radius ratios, which take place when the vehicle is accelerated with a widely open throttle (WOT) valve in the different drive modes of the vehicle.

FIG. 6 shows, for different drive modes of the vehicle, the relationship between lateral Gs and turning radius ratios R/R0 in the case that the vehicle 10 is accelerated with a wide open throttle (WOT) valve. WOT refers to a so-called full throttle with a maximum accelerator opening θap.

As shown in FIGS. 5 and 6, if the lateral G is less than a first deviation occurrence value Gdiv1 (first lateral G), the turning radius ratios R/R0 in the respective drive modes (FWD, RWD, and AWD modes) are of substantially equal values. If the lateral G becomes greater than the first deviation occurrence value Gdiv1, the turning radius ratio R/R0 in the FWD mode and the turning radius ratios R/R0 in the RWD and AWD modes start to deviate from each other. If the lateral G becomes greater than a second deviation occurrence value Gdiv2 (second lateral G), the turning radius ratio R/R0 in the RWD mode and the turning radius ratio R/R0 in the AWD mode start to deviate from each other.

As described above, when the turning radius ratios R/R0 in the drive modes deviate from each other, i.e., if the deviation exceeds a predetermined value at the same lateral G, switching between the drive modes tends to cause an abrupt change in the turning characteristics of the vehicle 10, thereby leading to the possibility that the driver of the vehicle 10 may feel uncomfortable. According to the present embodiment, if the lateral G exceeds a predetermined threshold value (hereinafter referred to as a "drive mode switching inhibition threshold value G1" or a "first lateral G threshold value G1"), the drive modes are inhibited from being switched.

According to the present embodiment, a first lateral G threshold value G1a (a first switching threshold value and a stopped-state threshold value) in the case that the engine 12 is presently stopped (at the processing time), and a first lateral G threshold value G1b (a second switching threshold value and an operating-state threshold value) in the case that the engine 12 is presently in operation, are used selectively as the first lateral G threshold value G1. The first lateral G threshold value G1 will hereinafter be used as a collective term, which is representative of the first lateral G threshold values G1a, G1b, or as one of the first lateral G threshold values G1a, G1b that actually is used for comparison with the lateral G.

As shown in FIG. 5, the first lateral G threshold value G1a is set to a value equal to the lateral G, i.e., the first deviation occurrence value Gdiv1, at which the turning radius ratios R/R0 in the FWD, RWD, and AWD modes start to deviate from each other. Alternatively, the first lateral G threshold value G1a may be set to a value that is less than the first deviation occurrence value Gdiv1, from the standpoint of reliably inhibiting the drive modes from being switched at the time that the turning radius ratios R/R0 actually start to deviate from each other. Further, alternatively, the first lateral G threshold value G1a may be set to a value that is slightly greater than the first deviation occurrence value Gdiv1, from the standpoint of keeping the deviation less than a predetermined value.

Further, as shown in FIG. 5, the lateral Gs at which the turning radius ratios R/R0 in the drive modes deviate from each other include the first deviation occurrence value Gdiv1 and the second deviation occurrence value Gdiv2. According to the present embodiment, the smaller of such values, i.e., the first deviation occurrence value Gdiv1, is set as the first lateral G threshold value G1a. The smaller of the first deviation occurrence value Gdiv1 and the second deviation occurrence value Gdiv2 will hereinafter be referred to as a "deviation reference value Gref".

The first lateral G threshold value G1b, which is used during operation of the engine 12, is set to a value that is less than the first lateral G threshold value G1a, which is used at the time that the engine 12 is stopped. This is based on the viewpoint that, in the case that the engine 12 is stopped, in terms of engine efficiency, it is preferable to delay starting of the engine 12. Further, when the engine 12 is in operation, it is preferable for the rear motors 16, 18 to be operated promptly, so as to increase maneuvering stability at an early stage.

By comparing FIGS. 5 and 6, it will be understood that the turning radius ratios R/R0 in the drive modes (and the first deviation occurrence value Gdiv1, the second deviation occurrence value Gdiv2, and the deviation reference value Gref) change depending on how the vehicle 10 is accelerated (for example, whether the vehicle 10 is gradually accelerated or is accelerated with WOT). According to the present embodiment, the first lateral G threshold value G1 (first lateral G threshold values G1a, G1b) varies depending on the accelerator opening θap. As will be described later, the first lateral G threshold value G1 may alternatively be varied depending on another indicator in addition to or instead of the accelerator opening θap.

According to the present embodiment, the drive mode is locked in the AWD mode when switching of the drive modes is inhibited accompanying an increase in the lateral G (step S5 of FIG. 3). Thus, the vehicle 10 is maintained in a stable posture even if the lateral G is large.

In the case that the drive mode is locked in the AWD mode, the engine 12 is operated. If up to this time, the drive mode has been in the RWD mode and the engine 12 is operated for the first time after the lateral G has reached the first lateral G threshold value G1, the running state of the vehicle 10 may possibly become unstable until the output power of the engine 12 reaches a required level. According to the present embodiment, the first lateral G threshold value G1a, which is used when the engine 12 is stopped, is used in combination with a certain lateral G threshold value for starting the engine 12 (hereinafter referred to as an "engine starting threshold value G2" or a "second lateral G threshold value G2"). The second lateral G threshold value G2 is set to a value that is less than the first lateral G threshold value G1a. Therefore, the engine 12 can be changed smoothly to the AWD mode from a drive mode in which the engine 12 is not used to drive the vehicle 10 (i.e., the RWD mode).

(1-2-2-2. Specific Processing Details)

Figure 7:
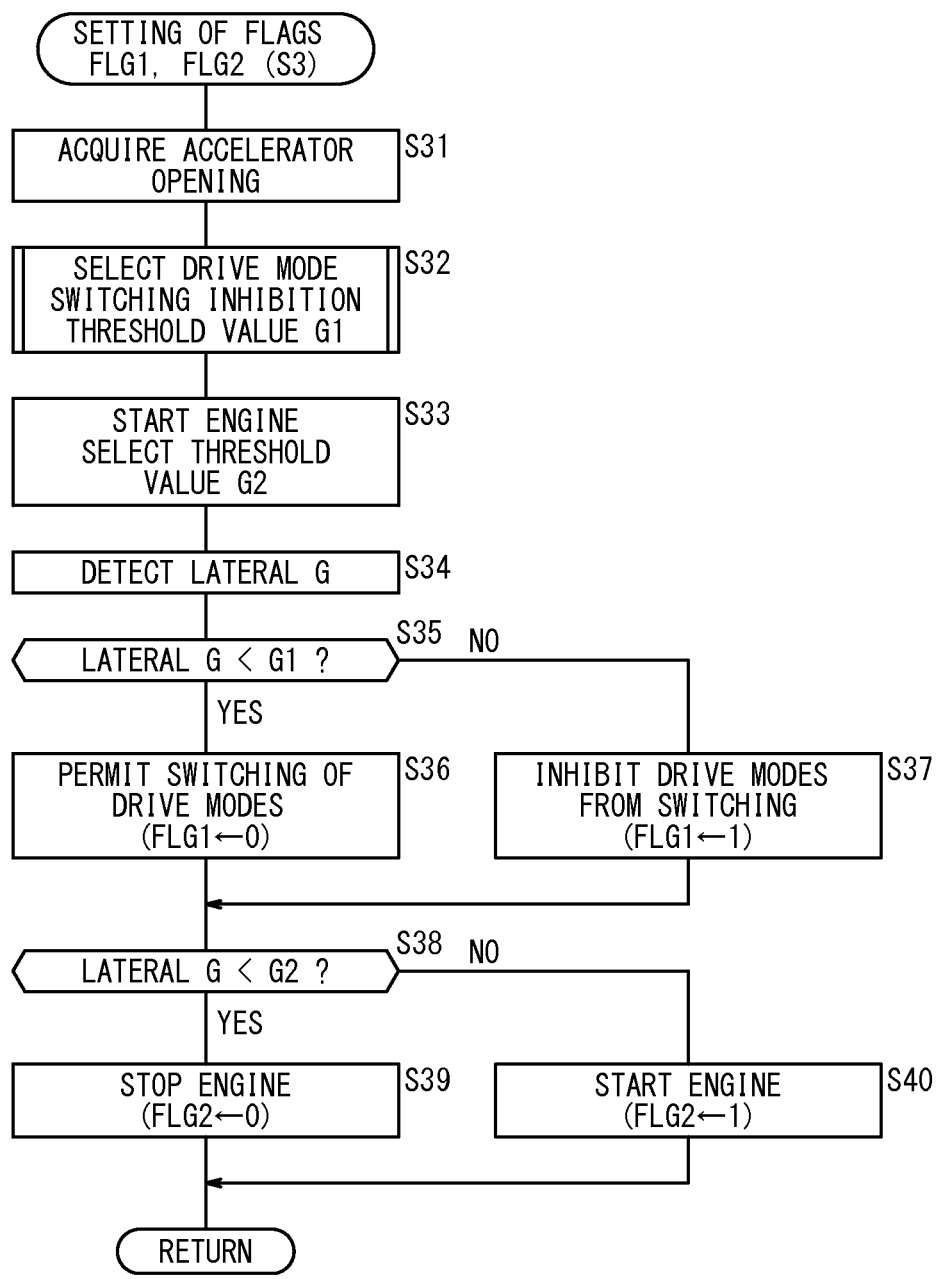
FIG. 7 is a flowchart of a sequence (details concerning step S3 of FIG. 3) for setting a first flag and a second flag.

FIG. 7 is a flowchart of a sequence (details of step S3 of FIG. 3) for setting the first flag FLG1 and the second flag FLG2. In step S31, the ECU 28 acquires the accelerator opening θap from the accelerator pedal opening sensor 54.

In step S32, based on the accelerator opening θap (see FIGS. 5 and 6), the ECU 28 selects a drive mode switching inhibition threshold value G1 (first lateral G threshold value G1). As described above, the threshold value G1 is selected from among the threshold values G1a, G1b. Details of a process for selecting the first lateral G threshold value G1 will be described later with reference to FIG. 9.

In step S33, based on the accelerator opening θap (see FIGS. 5 and 6), the ECU 28 selects an engine starting threshold value G2 (second lateral G threshold value G2). Details of a process for selecting the second lateral G threshold value G2 will be described later.

In step S34, the ECU 28 detects a lateral G. The ECU 28 detects a lateral G in the following manner. Namely, the ECU 28 detects (or calculates) a lateral G according to the following equation (1).

$$\text{Lateral } G = (V^2 \times \sigma)/(1+A+V^2)/L \tag{1}$$

Figure 8:
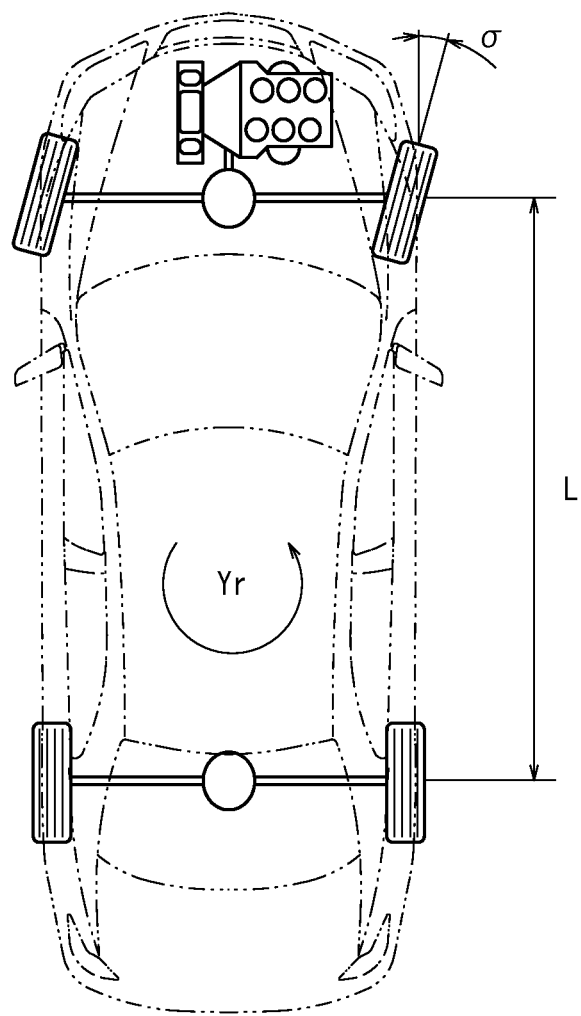
FIG. 8 is a view illustrating definitions of various values used in detecting a lateral G.

In equation (1), V denotes the vehicle speed detected by the vehicle speed sensor 50, σ denotes the tire steering angle detected by the tire steering angle sensor 58, A denotes a stability factor, and L denotes the wheelbase of the vehicle 10 (see FIG. 8).

According to equation (1), the lateral G increases as the tire steering angle σ increases. Consequently, it is possible to reflect the intention of the driver to turn the vehicle 10, even on a low-μ road in which the first deviation occurrence value Gdiv1 and the second deviation occurrence value Gdiv2 are lower than on a high-μ road. In addition, according to equation (1), it is possible to detect a lateral G on an inclined road or the like.

Alternatively, the ECU 28 may detect (or calculate) a lateral G according to the following equation (2).

$$\text{Lateral } G = Yr \times V \quad (2)$$

In equation (2), Yr denotes the yaw rate detected by the yaw rate sensor 56, and V denotes the vehicle speed detected by the vehicle speed sensor 50. According to equation (2), it is possible to detect a lateral G even if the vehicle 10 is spinning. In addition, according to equation (2), it is possible to detect a lateral G on an inclined road or the like.

A lateral G may be detected using a lateral G sensor, such as an electrostatic capacitance lateral G sensor, a piezoresistive lateral G sensor, or the like, which independently detects a lateral G.

In step S35 of FIG. 7, the ECU 28 judges whether or not the lateral G detected in step S34 is less than the drive mode switching inhibition threshold value G1 selected in step S32. If the lateral G is less than the threshold value G1 (step S35: YES), then in step S36, the ECU 28 sets the first flag FLG1 to 0 in order to permit switching of the drive modes. If the lateral G is not less than the threshold value G1 (step S35: NO), then in step S37, the ECU 28 sets the first flag FLG1 to 1 in order to inhibit switching of the drive modes.

In step S38, the ECU 28 judges whether or not the lateral G detected in step S34 is less than the engine starting threshold value G2 selected in step S33. If the lateral G is less than the threshold value G2 (step S38: YES), then in step S39, the ECU 28 sets the second flag FLG2 to 0 in order to keep the engine 12 stopped if the present drive mode is the RWD mode. If the lateral G is not less than the threshold value G2 (step S38: NO), then in step S40, the ECU 28 sets the second flag FLG2 to 1 in order to start operation of the engine 12 even if the present drive mode is the RWD mode.

(1-2-2-3. Setting of Drive Mode Switching Inhibition Threshold Value G1)

Figure 9:
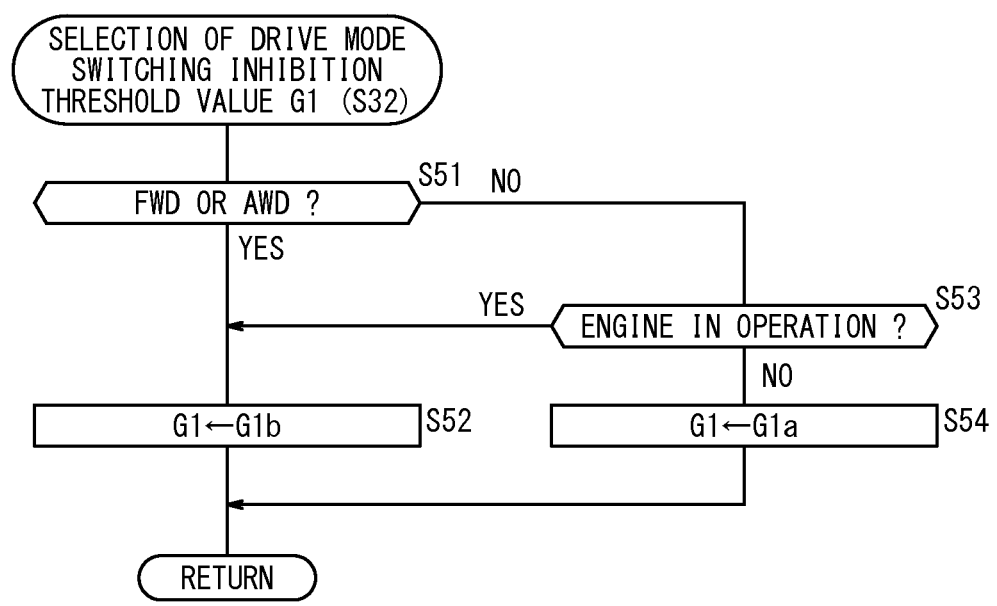
FIG. 9 is a flowchart of a sequence (details concerning step S32 of FIG. 7) for selecting a drive mode switching inhibition threshold value.

FIG. 9 is a flowchart of a sequence (details of step S32 of FIG. 7) for selecting the drive mode switching inhibition threshold value G1. In step S51, the ECU 28 judges whether or not the present drive mode (at the processing time) is the FWD mode or the AWD mode. Alternatively, since the drive mode, which is commanded by the ECU 28, may not necessarily agree with the actual drive mode of the wheels, i.e., the front wheels 32a, 32b and the rear wheels 36a, 36b, the ECU 28 may determine the drive mode using measured values, e.g., output signals from non-illustrated wheel speed sensors, which are combined with the respective wheels.

Figure 10:
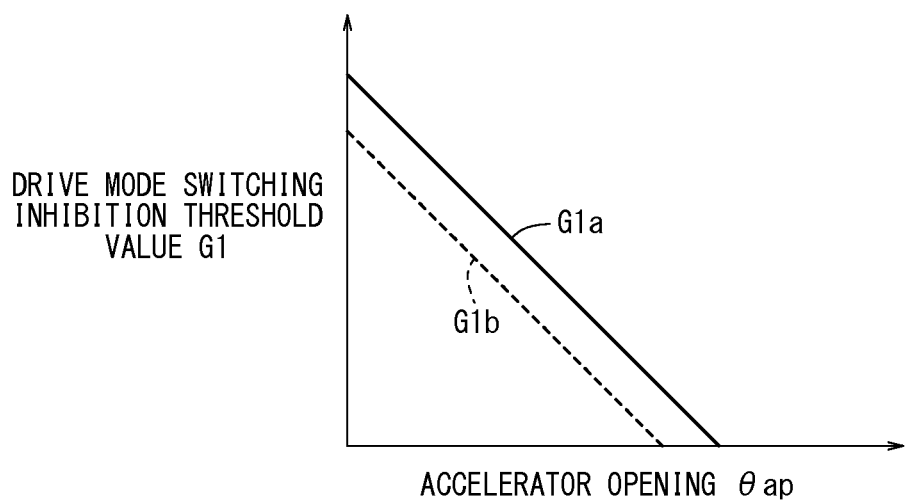
FIG. 10 is a diagram showing a first example of a relationship between accelerator openings and drive mode switching inhibition threshold values.
Figure 11:
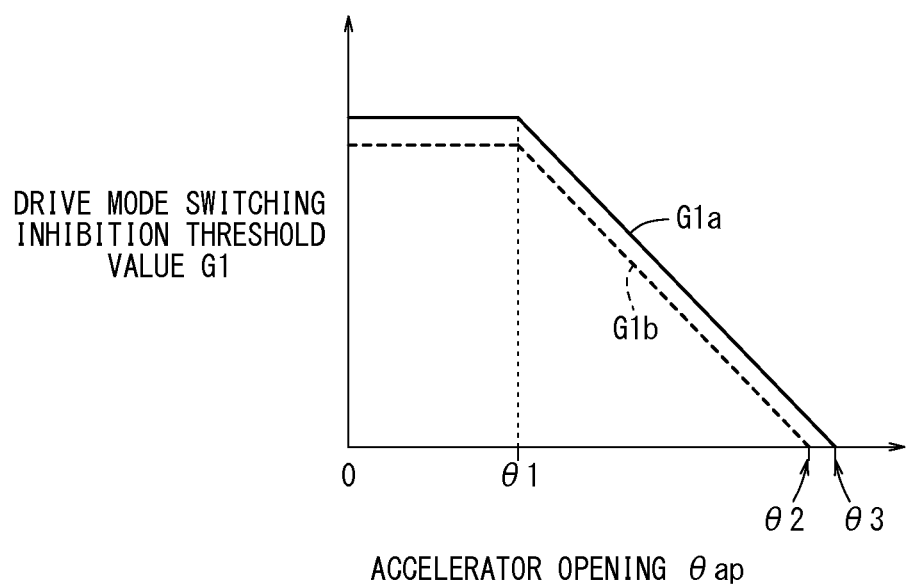
FIG. 11 is a diagram showing a second example of a relationship between accelerator openings and drive mode switching inhibition threshold values.

If the present drive mode is the FWD mode or the AWD mode (step S51: YES), then in step S52, the ECU 28 sets a first lateral G threshold value G1b, which is used during operation of the engine 12, depending on the accelerator opening θap (see FIGS. 5 and 6). The relationship between accelerator openings θap and threshold values G1b is stored in advance as a map in the memory 44, as shown in FIG. 10 or 11. The map may contain experimental values or simulated values.

As shown in FIG. 10, the threshold value G1b decreases as the accelerator opening θap increases. As shown in FIG. 11, the threshold value G1b remains constant while the accelerator opening θap changes from 0 to θ1, based on the concept that it is essentially meaningless to change the threshold value G1b as long as the acceleration is low (from 0 to θ1). As shown in FIG. 11, the threshold value G1b decreases while the accelerator opening θap changes from θ1 to θ2. Such a feature coincides with the fact that, as described above with reference to FIGS. 5 and 6, when the accelerator opening θap increases to thereby increase the fore-and-aft acceleration (fore-and-aft G), the first deviation occurrence value Gdiv1 and the second deviation occurrence value Gdiv2 are reduced.

In step S51 of FIG. 9, if the present drive mode is not the FWD mode or the AWD mode (step S51: NO), then in step S53, the ECU 28 judges whether or not the engine 12 is in operation. Even if the drive mode is the RWD mode (the vehicle 10 is driven by the rear motors 16, 18), the engine 12 may be operated to drive the first motor 14 in order to generate electric power if, for example, the SOC of the battery 20 is lower than a predetermined threshold value (SOC threshold value). Alternatively, the engine 12 may be operated to drive the first motor 14 in order to generate electric power for supplementing the electric power required to energize accessories, not shown.

Since step S51 is used essentially to judge whether or not the engine 12 is in operation, step S51 may be omitted and only step S52 may be used.

If the engine 12 is in operation (step S53: YES), then in step S52, as described above, the ECU 28 sets the first lateral G threshold value G1b, which is used when the engine 12 is in operation, depending on the accelerator opening θap.

If the engine 12 is not in operation (step S53: NO), then in step S54, the ECU 28 sets the first lateral G threshold value G1a, which is used when the engine 12 is stopped, depending on the accelerator opening θap (see FIGS. 5 and 6). In the same manner as with the first lateral G threshold values G1b, the relationship between accelerator openings θap and threshold values G1a is stored in advance as the map in the memory 44, as shown in FIG. 10 or 11. The map may contain experimental values or simulated values.

As shown in FIGS. 10 and 11, at the same accelerator opening θap, the first lateral G threshold value G1a, which is used when the engine 12 is stopped, is greater than the first lateral G threshold value G1b, which is used when the engine 12 is in operation. However, the first lateral G threshold value G1a is not required to be greater than the first lateral G threshold value G1b at all times. If the accelerator opening θap is small (e.g., in a range from 0 to θ1) or if the accelerator opening θap is large (e.g., in a range of θ2 or greater), the first lateral G threshold value G1a and the first lateral G threshold value G1b may be equal to each other.

(1-2-2-4. Setting of Engine Starting Threshold Value G2)

In step S33 of FIG. 7, the ECU 28 selects an engine starting threshold value G2 in the same manner as with the threshold value G1. The relationship between accelerator openings θap and threshold values G2 is stored in advance as a map in the memory 44. The map may contain experimental values or simulated values. Alternatively, differences with respect to the threshold values G1 may be preset, and the threshold value G2 may be set based on the threshold value G1.

(1-2-3. Processing Details for Switching Between Running Modes (Drive Modes))

Processing details for switching between running modes (drive modes) will be described below.

(1-2-3-1. Switching from RWD Mode to FWD Mode)

If the drive ECU 28 judges that the running mode (drive mode) should be switched from the RWD mode to the FWD mode, the drive ECU 28 temporarily uses the AWD mode during the process of changing from the RWD mode to the FWD mode.

More specifically, while the drive ECU 28 gradually reduces the drive force (rear wheel drive force Fr) transmitted to the rear wheels 36, which serve as non-steerable wheels, the drive ECU 28 gradually increases the drive force (front wheel drive force Ff) that is transmitted to the front wheels 32, which serve as steerable wheels. Consequently, the drive ECU 28 uses both the RWD mode and the FWD mode in a combined manner, i.e., in the condition of the AWD mode, temporarily (e.g., for a period of time ranging from 0.1 to 2.0 seconds).

However, the AWD mode that is used at the present time (hereinafter referred to as a "transitory AWD mode") differs from the AWD mode (shown in FIG. 2) that is judged by the drive ECU 28 as having been selected as the running mode (drive mode). Rather, the transitory AWD mode is used to transition from the RWD mode to the FWD mode. Stated otherwise, the AWD mode shown in FIG. 2 is set according to the processing sequence based on the flowcharts shown in FIGS. 3 and 4, whereas the transitory AWD mode is used when it is determined that the RWD mode should switch to the FWD mode according to the processing sequence based on the flowcharts shown in FIGS. 3 and 4. The drive modes may be switched based on at least one of the vehicle speed V, a change in the vehicle speed V, i.e., the derivative of the vehicle speed V with respect to time, the accelerator opening $\theta$ap, a change in the accelerator opening $\theta$ap, i.e., the derivative of the accelerator opening $\theta$ap with respect to time, and the yaw rate Yr.

In the transitory AWD mode, the total of the front wheel drive force Ff and the rear wheel drive force Fr (hereinafter referred to as a "total drive force Ftotal") is kept constant. The total drive force Ftotal, which is kept constant, allows the RWD mode to be switched to the FWD mode without causing a change in the behavior of the vehicle 10, thereby preventing the driver from feeling uncomfortable due to a change in the behavior of the vehicle 10 upon switching from the RWD mode to the FWD mode.

Alternatively, in the transitory AWD mode, the total drive force Ftotal may be changed depending on at least one of the accelerator opening $\theta$ap, a change in the accelerator opening $\theta$ap, and a change in the vehicle speed V. For example, the total drive force Ftotal may be increased if the accelerator opening $\theta$ap is large, if a change in the accelerator opening $\theta$ap is of a positive value, or if a change in the vehicle speed V is of a positive value. Further, the total drive force Ftotal may be reduced if the accelerator opening $\theta$ap is small, if a change in the accelerator opening $\theta$ap is of a negative value, or if a change in the vehicle speed V is of a negative value.

(1-2-3-2. Switching from FWD Mode to RWD Mode)

The FWD mode may be switched to the RWD mode in the same manner as when the RWD mode is switched to the FWD mode. In other words, the transitory AWD is used during a transition from the FWD mode to the RWD mode. Further, the total drive force Ftotal may be controlled during application of the transitory AWD mode.

(1-2-3-3. Switching from FWD Mode or RWD Mode to AWD Mode)

When switching from the FWD mode to the AWD mode, for example, the front wheel drive force Ff is kept constant, whereas the rear wheel drive force Fr is increased in order to increase the total drive force Ftotal. Alternatively, the front wheel drive force Ff is reduced and the rear wheel drive force Fr is increased in order to increase the total drive force Ftotal, or to keep the total drive force Ftotal constant. Further, alternatively, the front wheel drive force Ff is increased and the rear wheel drive force Fr is increased in order to increase the total drive force Ftotal.

Similarly, when switching from the RWD mode to the AWD mode, for example, the rear wheel drive force Fr is kept constant, whereas the front wheel drive force Ff is increased in order to increase the total drive force Ftotal. Alternatively, the rear wheel drive force Fr is reduced and the front wheel drive force Ff is increased in order to increase the total drive force Ftotal, or to keep the total drive force Ftotal constant. Further, alternatively, the rear wheel drive force Fr is increased and the front wheel drive force Ff is increased in order to increase the total drive force Ftotal.

(1-2-3-4. Switching from AWD Mode to FWD Mode or RWD Mode)

When switching from the AWD mode to the FWD mode, for example, the front wheel drive force Ff is kept constant, whereas the rear wheel drive force Fr is reduced in order to reduce the total drive force Ftotal. Alternatively, the front wheel drive force Ff is increased and the rear wheel drive force Fr is reduced in order to reduce the total drive force Ftotal, or to keep the total drive force Ftotal constant. Further, alternatively, the front wheel drive force Ff is reduced and the rear wheel drive force Fr is reduced in order to reduce the total drive force Ftotal.

Similarly, when switching from the AWD mode to the RWD mode, for example, the rear wheel drive force Fr is kept constant, whereas the front wheel drive force Ff is reduced in order to reduce the total drive force Ftotal. Alternatively, the rear wheel drive force Fr is increased and the front wheel drive force Ff is reduced in order to reduce the total drive force Ftotal, or to keep the total drive force Ftotal constant. Further, alternatively, the rear wheel drive force Fr is reduced and the front wheel drive force Ff is reduced in order to reduce the total drive force Ftotal.

C. Advantages of the Present Embodiment

With respect to switching from the FWD mode to the AWD mode, and switching from the RWD mode to the AWD mode depending on the lateral G (step S4 of FIG. 3: YES→S5), according to the present embodiment, different threshold values are set (see for example FIG. 5), i.e., the first lateral G threshold value G1a (first switching threshold value) for switching from the FWD mode to the AWD mode (step S51 of FIG. 9: NO→S54), and the first lateral G threshold value G1b (second switching threshold value) for switching from the RWD mode to the AWD mode (step S51: YES→S52). Stated otherwise, it is possible to switch the first lateral G threshold value G1 to different values in the case that the engine 12 is in operation and in the case that the engine 12 is stopped. Therefore, it is possible to switch between different drive modes in view of achieving a balance between energy consumption while the engine 12 is in operation and the driving stability of the vehicle 10, i.e., the capability of the vehicle 10 to be driven as the driver wishes.

According to the present embodiment, in addition, the first lateral G threshold value G1b (second switching threshold value), which is used in the FWD mode, is less than the first lateral G threshold value G1a (first switching threshold value), which is used in the RWD mode (see FIG. 5, etc.). Consequently, switching of the FWD mode to the AWD mode when the engine 12 is in operation occurs more quickly than switching of the RWD mode to the AWD mode when the engine 12 is not in operation. Therefore, if the engine 12 is in operation before switching to the AWD mode, it is possible to increase driving stability at an early stage.

With respect to the operating state of the engine 12 when the vehicle 10 is in the RWD mode, according to the present embodiment, different threshold values are set, i.e., the first lateral G threshold value G1a (stopped-state threshold value) for switching from the RWD mode to the AWD mode when the engine 12 is stopped (step S53 of FIG. 9: NO→S54), and the first lateral G threshold value G1b (operating-state threshold value) for switching from the RWD mode to the AWD mode when the engine 12 is in operation (step S53 of FIG. 9: YES→S52). Stated otherwise, the first lateral G threshold value G1 is switched to different values when the engine 12 is in operation and when the engine 12 is stopped. Therefore, it is possible to switch between different drive modes in view of achieving a balance between energy consumption during operation of the engine 12 and driving stability of the vehicle 10.

According to the present embodiment, in addition, the first lateral G threshold value G1b (operating-state threshold value), which is used when the engine 12 is in operation (step S53: YES), is less than the first lateral G threshold value G1a (stopped-state threshold value), which is used when the engine 12 is stopped (step S53: NO) (see FIG. 5, etc.). Consequently, the RWD mode is switched to the AWD mode more quickly while the engine 12 is in operation than when the engine 12 is stopped. Therefore, if the engine 12 is in operation prior to switching from the RWD mode to the AWD mode, it is possible to increase driving stability at an early stage.

II. Modifications

The present invention is not limited to the above-described embodiment, but various arrangements may be employed based on the above-described disclosure of the present invention. For example, the present invention may employ the following arrangements.

A. Vehicle 10 (Objects to which the Invention is Applied)

In the above embodiment, the present invention has been described in relation to the vehicle 10 as a self-propelled four-wheeled vehicle (FIG. 1). However, the present invention may also be applied to any type of vehicle that is capable of being switched between at least two of the FWD mode, the RWD mode, and the AWD mode, from the standpoint of a deviation in the turning radius ratios R/R0 in each drive mode, which takes place at the first deviation occurrence value Gdiv1 (first lateral G) or the second deviation occurrence value Gdiv2 (second lateral G). For example, the present invention may be applied to any one of a self-propelled two-wheeled vehicle, a self-propelled three-wheeled vehicle, and a self-propelled six-wheeled vehicle.

The present invention may also be applied to a vehicle that is capable of switching between a drive mode in which the engine 12 is not in operation, i.e., the RWD mode in the above embodiment, and the AWD mode, from the standpoint of setting the first lateral G threshold value G1 based on the operating state of the engine 12, i.e., a state in which the engine 12 is in operation or a state in which the engine 12 is stopped. For example, the present invention may be applied to any one of a self-propelled two-wheeled vehicle, a self-propelled three-wheeled vehicle, and a self-propelled six-wheeled vehicle.

In the above embodiment, the vehicle 10 includes the single engine 12 and the three traction motors 14, 16, 18 as drive sources. However, the drive sources are not limited to the above combination. As drive sources, the vehicle 10 may have one or more traction motors for the front wheels 32 and one or more traction motors for the rear wheels 36. For example, the vehicle 10 may have one traction motor for the front wheels 32 or the rear wheels 36. In this case, the drive force from the traction motor may be distributed through a differential to the left and right wheels. It is also possible for the vehicle 10 to have an arrangement in which individual traction motors (including so-called in-wheel motors) are assigned respectively to each of the wheels, from the standpoint of accounting for deviations in the turning radius ratio R/R0 in each drive mode at the first deviation occurrence value Gdiv1 (first lateral G) or the second deviation occurrence value Gdiv2 (second lateral G).

Furthermore, the present invention may also be applied to a vehicle that has one engine 12 for driving the vehicle and one motor for driving the vehicle, i.e., any one of the first through third motors 14, 16, 18, from the standpoint of setting the first lateral G threshold value G1 based on the state of the engine 12, i.e., during operation of the engine 12 or when the engine 12 is stopped.

Figure 12:
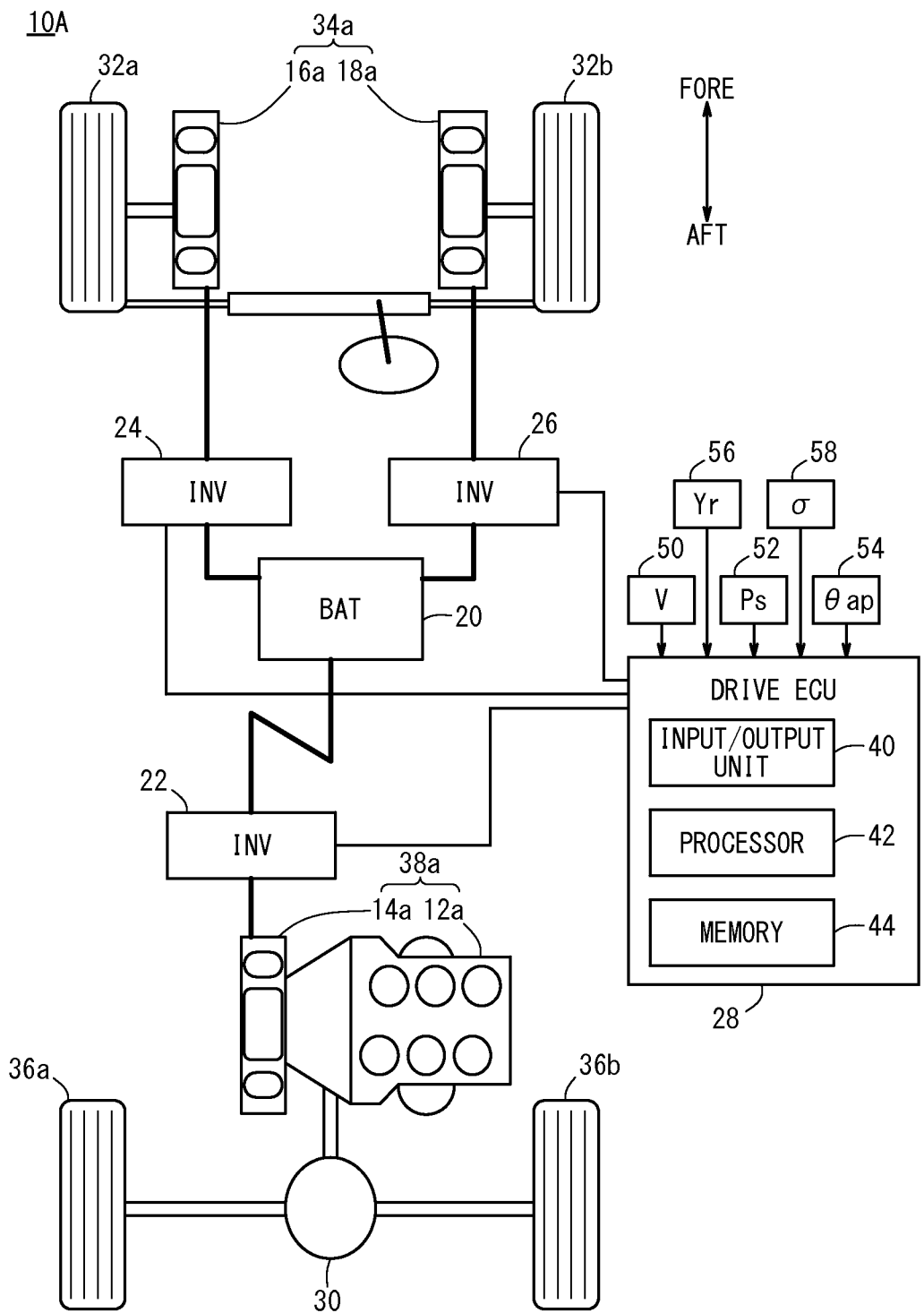
FIG. 12 is a schematic view showing a drive system and related components of a vehicle according to a modification of the present invention.

FIG. 12 schematically shows a drive system and related components of a vehicle 10A according to a modification of the present invention. The vehicle 10A includes a front wheel drive apparatus 34a and a rear wheel drive apparatus 38a, in which configurations thereof are in reverse to those of the vehicle 10 according to the aforementioned embodiment. More specifically, the front wheel drive apparatus 34a of the vehicle 10A has second and third traction motors 16a, 18a, which are disposed in a front portion of the vehicle 10A. Further, the rear wheel drive apparatus 38a of the vehicle 10A has an engine 12a and a first traction motor 14a, which are disposed in a series-connected layout in a rear portion of the vehicle 10A.

According to the above embodiment and the modification shown in FIG. 12, the front wheels 32 serve as steerable wheels and the rear wheels 36 serve as non-steerable wheels. However, both the front wheels 32 and the rear wheels 36 may serve as steerable wheels, or the rear wheels 36 may serve as steerable wheels whereas the front wheels 32 may serve as non-steerable wheels.

B. First Through Third Traction Motors 14, 16, 18

In the above embodiment, each of the first through third traction motors 14, 16, 18 comprises a three-phase AC brushless motor. However, the first through third traction motors 14, 16, 18 may be constituted by three-phase AC brush motors, single-phase AC motors, or DC motors.

In the above embodiment, the first through third traction motors 14, 16, 18 are supplied with electric power from the high-voltage battery 20. However, the first through third traction motors 14, 16, 18 may be supplied additionally with electric power from fuel cells.

C. Control of Drive Modes of the Vehicle 10

C-1. Switching Between Drive Modes

In the above embodiment, drive modes are switched according to the processing sequence of the flowcharts shown in FIGS. 3 and 4. However, the drive modes may be switched according to other methods. For example, the drive modes may be switched based on at least one of the vehicle speed V, a change in the vehicle speed V, the accelerator opening θap, a change in the accelerator opening θap, and the yaw rate Yr. Alternatively, the running modes (drive modes) may be switched according to the process shown in FIG. 13 and the related description thereof appearing in US2012/0015772A1.

In the above embodiment, the FWD mode, the RWD mode, and the AWD mode serve as respective drive modes of the vehicle 10 that are capable of being switched. However, the present invention may be applied to a vehicle that is capable of switching between at least two of the FWD mode, the RWD mode, and the AWD mode from the standpoint of a deviation in the turning radius ratio R/R0 in each drive mode at the first deviation occurrence value Gdiv1 (first lateral G) or the second deviation occurrence value Gdiv2 (second lateral G). For example, the present invention may be applied to a vehicle that is capable of switching between only the FWD mode and the AWD mode (first switching), as well as to a vehicle that is capable of switching between only the RWD mode and the AWD mode (second switching). The present invention may also be applied to a vehicle having one engine 12 for driving the vehicle 10 and one motor for driving the vehicle 10, from the standpoint of setting the first lateral G threshold value G1 based on the state of the engine 12, i.e., when the engine 12 is in operation or when the engine 12 is stopped.

In the above embodiment, if the lateral G becomes equal to or greater than the first lateral G threshold value G1 (step S35 of FIG. 7: NO) and the drive modes are inhibited from switching (step S37 of FIG. 7, step S4 of FIG. 3: YES), then the drive mode is locked to the AWD mode (step S5 of FIG. 3). However, the drive mode selected when the drive modes are inhibited from switching is not limited to the AWD mode. For example, the drive mode selected when the drive modes are inhibited from switching may be the FWD mode or the RWD mode. Alternatively, a preset drive mode may not be selected, but the drive mode may be locked to a drive mode that has been selected when the drive modes are inhibited from switching, i.e., a drive mode immediately before the drive modes are inhibited from switching.

C-2. Drive Mode Switching Inhibition Threshold Value G1 (First Lateral G Threshold Value G1)

In the above embodiment, a value equal to the first deviation occurrence value Gdiv1, which defines a boundary value at which the turning radius ratio R/R0 of the FWD mode starts to deviate from those of the RWD mode and the AWD mode, is used as the first lateral G threshold value G1a (see FIG. 5, etc.). However, the first lateral G threshold value G1a may be set to other values. For example, the first lateral G threshold value G1a may be set to a value that is less than the first deviation occurrence value Gdiv1, from the standpoint of reliably inhibiting the drive modes from switching at the time that the turning radius ratios R/R0 actually start to deviate from each other. Further, alternatively, the first lateral G threshold value G1a may be set to a value that is slightly greater than the first deviation occurrence value Gdiv1, from the standpoint of ensuring that the deviation remains less than a predetermined value.

In the above embodiment, the drive mode switching inhibition threshold value G1 is used as the value for the lateral G. However, the drive mode switching inhibition threshold value G1 may be a value that is related to the lateral G (a lateral acceleration-related value). The lateral acceleration-related value includes the lateral G value itself. For example, in view of the fact that, according to the above equation (2), the lateral G is calculated as a product of the yaw rate Yr and the vehicle speed V (lateral G=Yr×V), a quotient produced when the first lateral G threshold value G1 is divided by the vehicle speed V (G1/V) may be compared with the yaw rate Yr, or a quotient produced when the first lateral G threshold value G1 is divided by the yaw rate Yr (G1/Yr) may be compared with the vehicle speed V, thereby providing the same advantages as those of the above embodiment. Stated otherwise, rather than a value that directly indicates a lateral G, a value that indirectly indicates the lateral G, i.e., the yaw rate Yr or the vehicle speed V according to the above embodiment, may be compared with a predetermined threshold value, i.e., a value that indirectly indicates the first lateral G threshold value G1, thereby providing essentially the same advantages as those of the above embodiment. The same technique may be applied to the above equation (1).

From the standpoint of setting the first lateral G threshold value G1a based on the state of the engine 12 (when the engine 12 is in operation or when the engine 12 is stopped), the first lateral G threshold value G1a need not necessarily be set based on the first deviation occurrence value Gdiv1 or the deviation reference value Gref. Stated otherwise, the first lateral G threshold values G1a, G1b may be switched when the engine 12 is in operation and when the engine 12 is stopped.

In the above embodiment, the first lateral G threshold value G1b, which is used when the engine 12 is in operation, is less than the first lateral G threshold value G1a, which is used when the engine 12 is stopped (see FIG. 5, etc.). However, the first lateral G threshold value G1b may be greater than the first lateral G threshold value G1a, for thereby achieving driving stability at an early stage when the vehicle is in the RWD mode.

In the above embodiment, the first lateral G threshold value G1 (first lateral G threshold values G1a, G1b) is switched based on the accelerator opening θap (see FIGS. 5, 6, 10, and 11). However, another value, which affects a change (deviation) in the turning radius ratio R/R0, or a similar turning characteristic related value, which depends on switching between drive modes, may be used in addition to or instead of the accelerator opening θap.

Figure 14:
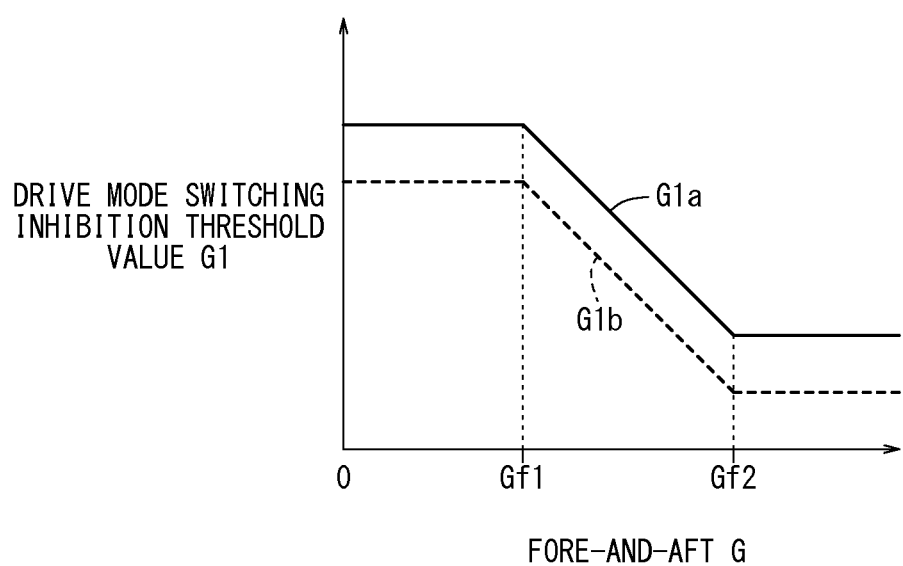
FIG. 14 is a diagram showing a second example of a relationship between fore-and-aft Gs and drive mode switching inhibition threshold values.

For example, as shown in FIGS. 13 and 14, it is possible for the drive mode switching inhibition threshold values G1a, G1b (the first lateral G threshold values G1a, G1b) to be changed based on the fore-and-aft acceleration (fore-and-aft G). The fore-and-aft G may be detected by a non-illustrated fore-and-aft G sensor, for example. As shown in FIG. 13, the threshold values G1a, G1b decrease as the fore-and-aft G increases.

Further, in FIG. 14, the threshold values G1a, G1b are kept constant while the fore-and-aft G ranges from 0 to Gf1, based on the concept that it is essentially meaningless to change the threshold values G1a, G1b for the lateral G as long as the fore-and-aft G is low (i.e., ranges from 0 to Gf1). The threshold values G1a, G1b are reduced while the fore-and-aft G ranges from Gf1 to Gf2. This is because, as described above with reference to FIGS. 5 and 6, etc., as the fore-and-aft G increases, the first deviation occurrence value Gdiv1 and the second deviation occurrence value Gdiv2 are reduced with respect to the lateral G. The threshold values G1a, G1b remain constant when the fore-and-aft G is greater than Gf2, because the threshold values G1a, G1b have reached their minimum values.

Figure 15:
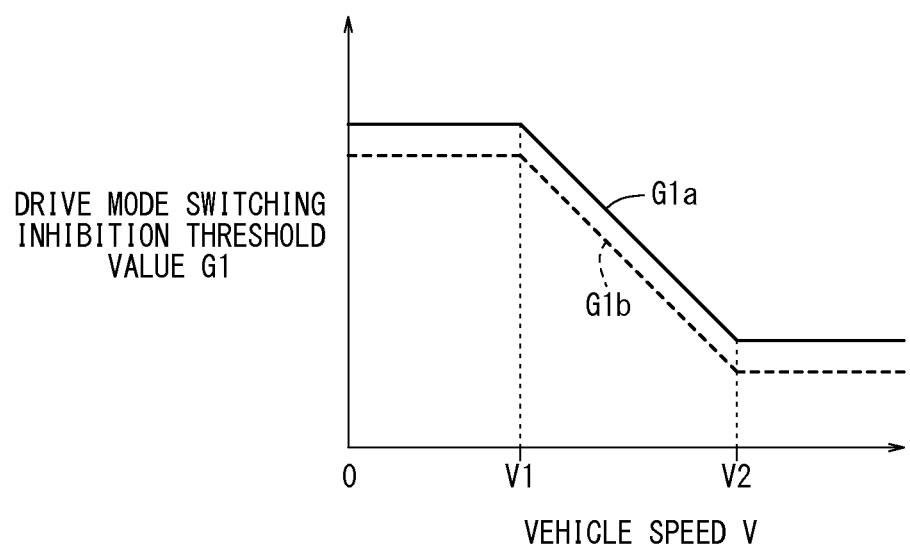
FIG. 15 is a diagram showing an example of a relationship between vehicle speeds and drive mode switching inhibition threshold values.

Alternatively, as shown in FIG. 15, the first lateral G threshold values G1a, G1b may be changed based on the vehicle speed V. In FIG. 15, the first lateral G threshold values G1a, G1b are kept constant while the vehicle speed V ranges from 0 to V1, based on the concept that it is essentially meaningless to change the threshold values G1a, G1b as long as the vehicle speed V is low (i.e., ranges from 0 to V1). The threshold values G1a, G1b are reduced while the vehicle speed V ranges from V1 to V2. This is because, as described above with reference to FIGS. 5 and 6, etc., as the vehicle speed V increases, thereby increasing the fore-and-aft G, the first deviation occurrence value Gdiv1 and the second deviation occurrence value Gdiv2 are reduced with respect to the lateral G. The threshold values G1a, G1b remain constant when the vehicle speed V is greater than V2, because the threshold values G1a, G1b have reached their minimum values.

Further, alternatively, the first lateral G threshold values G1a, G1b may be changed based on an accelerating intention related value (other than the accelerator opening θap), which indicates the intention of the driver to begin accelerating. For example, the accelerating intention related value other than the accelerator opening θap may be a demand value for the drive force (demand drive force) of the engine 12, which is set depending on the accelerator opening θap, or a target drive force, which actually is set as a target value for the drive force of the engine 12, according to various control processes including a feedback control process, a limiting control process, etc., performed on the demand drive force, for example.

If the conditions in which the lateral G becomes equal to or greater than the first lateral G threshold values G1a, G1b are very limited, then the first lateral G threshold values G1a, G1b may be fixed during use thereof.

In the above-described embodiment, the first lateral G threshold value G1a is set based on the deviation reference value Gref, which is the smaller of the first deviation occurrence value Gdiv1 and the second deviation occurrence value Gdiv2. In other words, the first lateral G threshold value G1a has been used irrespective of a switching type of the drive modes.

However, in view of the fact that the first deviation occurrence value Gdiv1 and the second deviation occurrence value Gdiv2 differ from each other, as shown in FIGS. 5 and 6, the first lateral G threshold value G1a may be made variable depending on the manner in which the drive modes are switched. Stated otherwise, depending on the manner in which the drive modes are switched, it is possible to set the first lateral G threshold value G1a to a different value. For example, upon switching between the FWD mode and the RWD mode or the AWD mode, the first deviation occurrence value Gdiv1 may be used as the first lateral G threshold value G1a, and upon switching between the RWD mode and the AWD mode, the second deviation occurrence value Gdiv2 may be used as the first lateral G threshold value G1a. With respect to the first lateral G threshold value G1, which is used upon switching between the RWD mode and the AWD mode, the first lateral G threshold value G1a may be switched depending on how the engine 12 is operating, similar to the case of the first lateral G threshold values G1a, G1b according to the above embodiment.

In the above embodiment, the first lateral G threshold value G1a is set by way of comparison between the first deviation occurrence value Gdiv1 (first lateral G) and the second deviation occurrence value Gdiv2 (second lateral G). However, the first lateral G threshold value G1a remains essentially the same, even if the first lateral G threshold value G1a is set in view of a change in the turning radius ratio R/R0 that occurs upon switching between the drive modes.

More specifically, the first lateral G threshold value G1a may be set based on the smaller of a first change, which is a predicted change caused in the turning radius ratio R/R0 upon switching between the FWD mode and the AWD mode while the lateral G stays above the first lateral G threshold value G1a (first switching), and a second change, which is a predicted change caused in the turning radius ratio R/R0 upon switching between the RWD mode and the AWD mode while the lateral G stays above the first lateral G threshold value G1a (second switching). The first switching and the second switching include the transitory AWD mode, which occurs upon switching between the FWD mode and the RWD mode. Alternatively, if the first lateral G threshold value G1a is set depending on how the drive modes are switched, the first lateral G threshold value G1a may be set depending on each of the first change and the second change.

In the above embodiment, the first lateral G threshold values G1a, G1b are stored in advance in the memory 44 of the ECU 28. However, the first lateral G threshold values G1a, G1b may be calculated successively while the vehicle 10 is being driven. If the first lateral G threshold values G1a, G1b are calculated in this manner, the relationship between the lateral Gs and the turning radius ratios R/R0 may be stored for each of the drive modes, and thereafter, the lateral G at which a change in the turning radius ratio R/R0 becomes equal to or greater than a predetermined value may be used as the first lateral G threshold value G1a, whereas the first lateral G threshold value G1b may be calculated from the relationship thereof to the first lateral G threshold value G1a.

C-3. Turning Radius Ratio R/R0 (Turning Characteristic Related Value)

In the above embodiment, upon switching between the drive modes, the turning radius ratio R/R0 is used as a turning characteristic related value, which deviates in relation to the lateral G. However, the first lateral G threshold value G1 and the second lateral G threshold value G2 may be set based on a different turning characteristic related value, such as the actual turning radius R per se, or a Slip Ratio of any One of the Wheels, for Example.

C-4. Engine Starting Threshold Value G2 (Second Lateral G Threshold Value G2)

In the above-described embodiment, the second lateral G threshold value G2 is set based on the accelerator opening θap. However, the second lateral G threshold value G2 may be set based on other factors, insofar as the engine 12 can be started based on a judgment that a high possibility exists for the lateral G to become equal to or greater than the first lateral G threshold value G1a in the future. For example, similar to the case of the first lateral G threshold value G1a, the second lateral G threshold value G2 may be set based on another value, such as the fore-and-aft G or the vehicle speed V, in addition to or instead of the accelerator opening θap. Alternatively, if there are very limited conditions in which the lateral G becomes equal to or greater than the first lateral G threshold value G1a, the second lateral G threshold value G2 may be fixed during use thereof, similar to the case of the first lateral G threshold value G1a.

Alternatively, the threshold value G2 may be set based on the threshold value G1a. Based on the concept that, if the fore-and-aft G is small, a change in the lateral G, i.e., the derivative of the lateral G with respect to time, is small, the threshold value G2 may be set to a value, the difference of which from the threshold value G1a is small when the fore-and-aft G is small, and the threshold value G2 may be set to a value, the difference of which from the threshold value G1a is large when the fore-and-aft G is large.

C-5. Other Features

In step S2 of FIG. 3, the ECU 28 judges whether or not the rear motors 16, 18 are capable of being energized based on the temperatures of the rear motors 16, 18, the occurrence of a failure of the rear motors 16, 18, and the SOC of the battery 20. However, the ECU 28 may judge whether or not the rear motors 16, 18 are capable of being energized in different ways. For example, the ECU 28 may judge whether or not the rear motors 16, 18 are capable of being energized based on only one or two of such conditions, i.e., the temperatures of the rear motors 16, 18, the occurrence of a failure of the rear motors 16, 18, and the SOC of the battery 20.

Alternatively, in addition to or instead of the above indicators, other indicators may be used. For example, a degree of deterioration of the battery 20, i.e., the number of times that the battery 20 has been charged, the period during which the battery 20 has been used, etc., may be used.

According to the flowchart of FIG. 4, if the vehicle 10 is driven in the high speed range (step S12: NO), the ECU 28 selects the FWD mode and does not energize the rear motors 16, 18. Therefore, based on the vehicle speed V, the ECU 28 actually determines whether or not the rear motors 16, 18 are capable of being energized.

In the above embodiment, the engine 12 is not idling when the RWD mode is selected, but rather, the engine 12 is stopped, except in step S7 of FIG. 3, and except at times that the first motor 14 is generating electric power under the drive force of the first motor 14. The engine 12 may remain idling in a standby mode in certain situations other than step S7 of FIG. 3, and other than when the first motor 14 is generating electric power.

The invention claimed is:

1. A vehicle comprising:
a first drive apparatus configured to drive one of a front wheel and a rear wheel;
a second drive apparatus configured to drive another one of the front wheel and the rear wheel, the second drive apparatus including an internal combustion engine;
a drive mode controller configured to control the first drive apparatus and the second drive apparatus in order to control drive modes of the front wheel and the rear wheel; and
an internal combustion engine controller configured to control an operating state of the internal combustion engine;
wherein the drive mode controller switches between a first independent drive mode, in which the vehicle is driven only by a drive force from the first drive apparatus, a second independent drive mode, in which the vehicle is driven only by a drive force from the second drive apparatus, and a composite drive mode, in which the vehicle is driven by a drive force from the first drive apparatus and the second drive apparatus;
wherein the drive mode controller acquires a lateral acceleration-related value indicating a lateral acceleration acting on the vehicle and switches from the first independent drive mode to the composite drive mode, and from the second independent drive mode to the composite drive mode, based on the lateral acceleration-related value indicating a lateral acceleration acting on the vehicle; and
wherein different values are set as a first switching threshold value, which indicates the lateral acceleration-related value for switching from the first independent drive mode to the composite drive mode, and a second switching threshold value, which indicates the lateral acceleration-related value for switching from the second independent drive mode to the composite drive mode; and
wherein the lateral acceleration-related value or the first and second switching threshold values vary depending on the lateral acceleration.

2. The vehicle according to claim 1, wherein the second switching threshold value is less than the first switching threshold value.

3. The vehicle according to claim 1, wherein the lateral acceleration-related value directly indicates a value of the lateral acceleration.

4. A vehicle comprising:
a first drive apparatus configured to drive one of a front wheel and a rear wheel;
a second drive apparatus configured to drive another one of the front wheel and the rear wheel, the second drive apparatus including an internal combustion engine;
a drive mode controller configured to control the first drive apparatus and the second drive apparatus in order to control drive modes of the front wheel and the rear wheel; and
an internal combustion engine controller configured to control an operating state of the internal combustion engine;
wherein the drive mode controller switches between a first independent drive mode, in which the vehicle is driven only by a drive force from the first drive apparatus, and a composite drive mode, in which the vehicle is driven by a drive force from the first drive apparatus and the second drive apparatus;
wherein the drive mode controller switches from the first independent drive mode to the composite drive mode, based on a lateral acceleration-related value indicating a lateral acceleration acting on the vehicle; and
wherein different values are set as a stopped-state threshold value, which indicates the lateral acceleration-related value for switching from the first independent drive mode to the composite drive mode while the internal combustion engine is stopped, and an operating-state threshold value, which indicates the lateral acceleration-related value for switching from the first independent drive mode to the composite drive mode while the internal combustion engine is in operation; and
wherein the lateral acceleration-related value or the stopped-state and operating-state threshold values vary depending on the lateral acceleration.

5. The vehicle according to claim 4, wherein the operating-state threshold value is less than the stopped-state threshold value.

6. The vehicle according to claim 4, wherein, in the first independent drive mode, the internal combustion engine applies a drive force selectively to an electric generator disposed in the vehicle.

7. The vehicle according to claim 4, wherein the lateral acceleration-related value directly indicates a value of the lateral acceleration.

8. A method of controlling a vehicle including a first drive apparatus configured to drive one of a front wheel and a rear wheel, a second drive apparatus configured to drive another one of the front wheel and the rear wheel, the second drive apparatus including an internal combustion engine, a drive mode controller configured to control the first drive apparatus and the second drive apparatus in order to control drive modes of the front wheels and the rear wheels, and an internal combustion engine controller configured to control an operating state of the internal combustion engine, the method performed by the drive mode controller comprising:
switching between a first independent drive mode, in which the vehicle is driven only by a drive force from the first drive apparatus, a second independent drive mode, in which the vehicle is driven only by a drive force from the second drive apparatus, and a composite drive mode, in which the vehicle is driven by a drive force from the first drive apparatus and the second drive apparatus;

acquiring a lateral acceleration-related value indicating a lateral acceleration acting on the vehicle;

switching from the first independent drive mode to the composite drive mode, and from the second independent drive mode to the composite drive mode, based on the lateral acceleration-related value indicating a lateral acceleration acting on the vehicle; and setting different values as a first switching threshold value, which indicates the lateral acceleration-related value for switching from the first independent drive mode to the composite drive mode, and a second switching threshold value, which indicates the lateral acceleration-related value for switching from the second independent drive mode to the composite drive mode; and wherein the lateral acceleration-related value or the first and second switching threshold values vary depending on the lateral acceleration.

9. The method according to claim 8, wherein the lateral acceleration-related value directly indicates a value of the lateral acceleration.

10. The method according to claim 8, wherein the second switching threshold value is less than the first switching threshold value.

11. A method of controlling a vehicle including a first drive apparatus configured to drive one of a front wheel and a rear wheel, a second drive apparatus configured to drive another one of the front wheel and the rear wheel, the second drive apparatus including an internal combustion engine, a drive mode controller configured to control the first drive apparatus and the second drive apparatus in order to control drive modes of the front wheels and the rear wheels, and an internal combustion engine controller configured to control an operating state of the internal combustion engine, the method performed by the drive mode controller comprising:

switching between a first independent drive mode, in which the vehicle is driven only by a drive force from the first drive apparatus, and a composite drive mode, in which the vehicle is driven by a drive force from the first drive apparatus and the second drive apparatus;

switching from the first independent drive mode to the composite drive mode, based on a lateral acceleration-related value indicating a lateral acceleration acting on the vehicle; and setting different values as a stopped-state threshold value, which indicates the lateral acceleration-related value for switching from the first independent drive mode to the composite drive mode while the internal combustion engine is stopped, and an operating-state threshold value, which indicates the lateral acceleration-related value for switching from the first independent drive mode to the composite drive mode while the internal combustion engine is in operation; and wherein the lateral acceleration-related value or the stopped-state and operating-state threshold values vary depending on the lateral acceleration.

12. The method according to claim 11, wherein the lateral acceleration-related value directly indicates a value of the lateral acceleration.

13. The method according to claim 11, wherein the operating-state threshold value is less than the stopped-state threshold value.

\* \* \* \* \*